(12) United States Patent
Takahashi et al.

(10) Patent No.: US 11,606,527 B2
(45) Date of Patent: Mar. 14, 2023

(54) TRANSMITTER

(71) Applicant: Sony Semiconductor Solutions Corporation, Kanagawa (JP)

(72) Inventors: Tomohiro Takahashi, Kanagawa (JP); Tatsuya Sugioka, Tokyo (JP); Naoki Yoshimochi, Tokyo (JP); Yoshiaki Inada, Tokyo (JP); Masatsugu Kobayashi, Kanagawa (JP); Koji Yoda, Kanagawa (JP); Takahiro Iinuma, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 240 days.

(21) Appl. No.: 16/761,136

(22) PCT Filed: Aug. 27, 2018

(86) PCT No.: PCT/JP2018/031565
§ 371 (c)(1),
(2) Date: May 1, 2020

(87) PCT Pub. No.: WO2019/092952
PCT Pub. Date: May 16, 2019

(65) Prior Publication Data
US 2020/0275046 A1 Aug. 27, 2020

(30) Foreign Application Priority Data
Nov. 10, 2017 (JP) .............................. JP2017-217833

(51) Int. Cl.
H04N 5/38 (2006.01)
H04N 5/232 (2006.01)

(52) U.S. Cl.
CPC ............ *H04N 5/38* (2013.01); *H04N 5/23227* (2018.08)

(58) Field of Classification Search
CPC ................. H04N 5/38; H04N 5/23227; H04N 5/23218; H04N 19/167; H04N 19/17;
(Continued)

(56) References Cited

U.S. PATENT DOCUMENTS 8,305,456 B1 * 11/2012 McMahon ........... H04N 5/2253
348/207.1
2009/0097704 A1 4/2009 Savidge et al.
(Continued)

FOREIGN PATENT DOCUMENTS

CN 103765864 A 4/2014
CN 104106258 A 10/2014
(Continued)

OTHER PUBLICATIONS

Chinese Office Action dated Nov. 30, 2021 for corresponding Chinese Application No. 2018800710469.

*Primary Examiner* — Yogesh K Aggarwal
(74) *Attorney, Agent, or Firm* — Michael Best & Friedrich LLP

(57) ABSTRACT

There is provided is a transmitter including an image processor that sets region information corresponding to a region set for an image for each row in the image and that transmits the set region information and region data corresponding to the region for each row, in which the image processor sets the region by analyzing the image or on a basis of externally acquired region-designating information, and the region information includes information indicating a position of a row and information indicating a position of a column of the region included in the row.

17 Claims, 14 Drawing Sheets

(58) Field of Classification Search
CPC .... H04N 19/70; H04N 5/3454; H04N 21/236; H04N 21/434; H04N 5/23229; H04N 21/2356; H04N 21/23605; H04N 21/4343; G06V 10/25; G06V 10/96

See application file for complete search history.

(56) References Cited

U.S. PATENT DOCUMENTS

| | | | |
|---|---|---|---|
| 2015/0271411 A1* | 9/2015 | Wang | H04N 5/3454 348/241 |
| 2016/0065873 A1 | 3/2016 | Maeta | |

FOREIGN PATENT DOCUMENTS

| | | | |
|---|---|---|---|
| CN | 105391936 A | | 3/2016 |
| JP | H02306765 A | | 12/1990 |
| JP | 2005-142654 A | | 6/2005 |
| JP | 2006109001 A | * | 4/2006 |
| JP | 2006109001 A | | 4/2006 |
| JP | 2012150152 A | | 8/2012 |
| JP | 2012-209831 A | | 10/2012 |
| JP | 2013-164834 A | | 8/2013 |
| JP | 2014-039219 A | | 2/2014 |
| JP | 2015-216558 A | | 12/2015 |
| JP | 2016-504890 A | | 2/2016 |
| JP | 2016-201756 A | | 12/2016 |

* cited by examiner

[ FIG. 1 ]
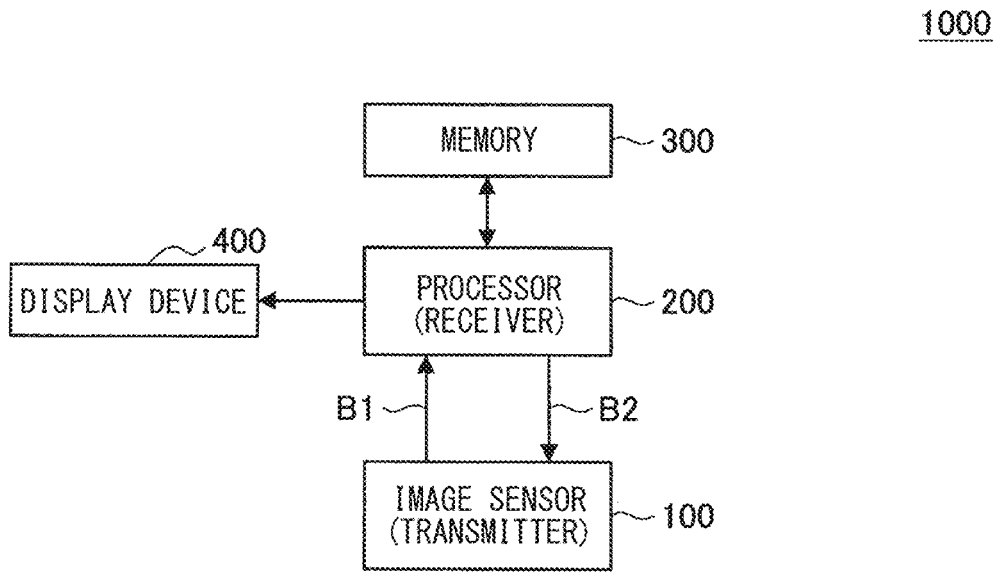
[ FIG. 2 ]
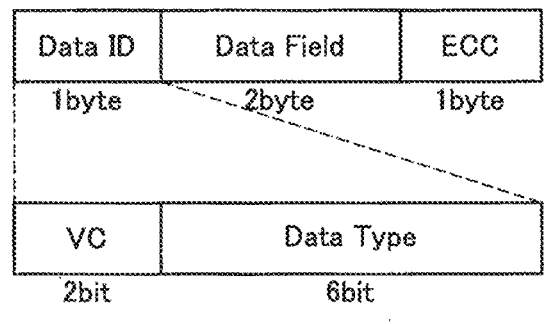
[ FIG. 3 ]
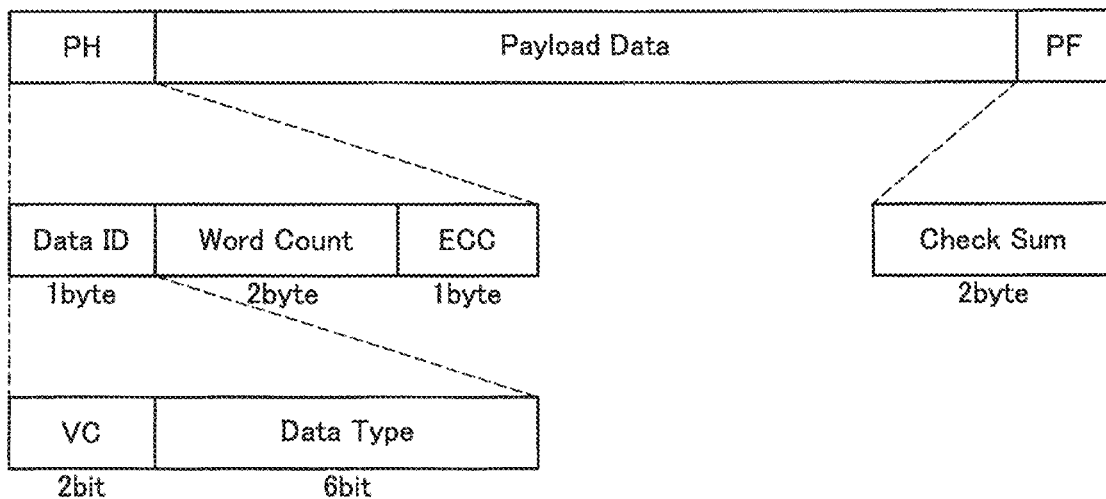

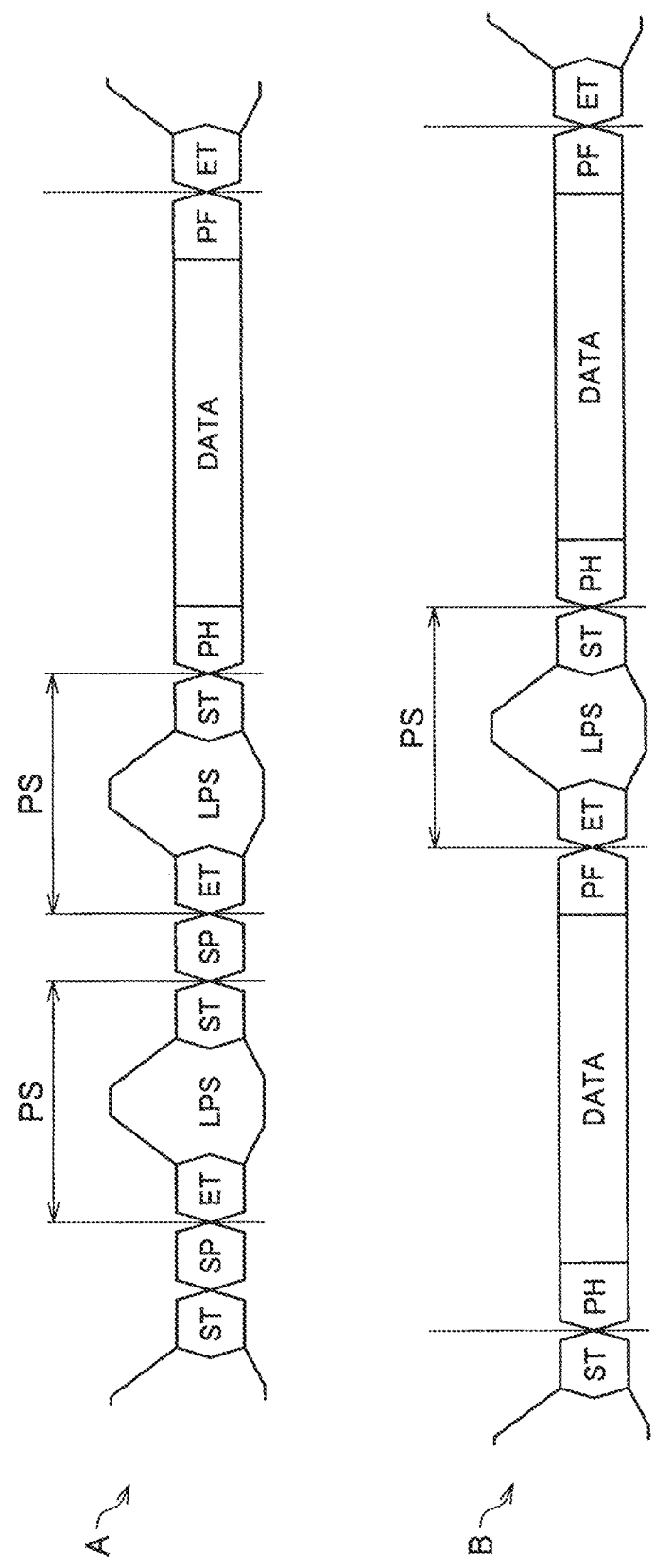
[FIG. 4]

[ FIG. 5 ]
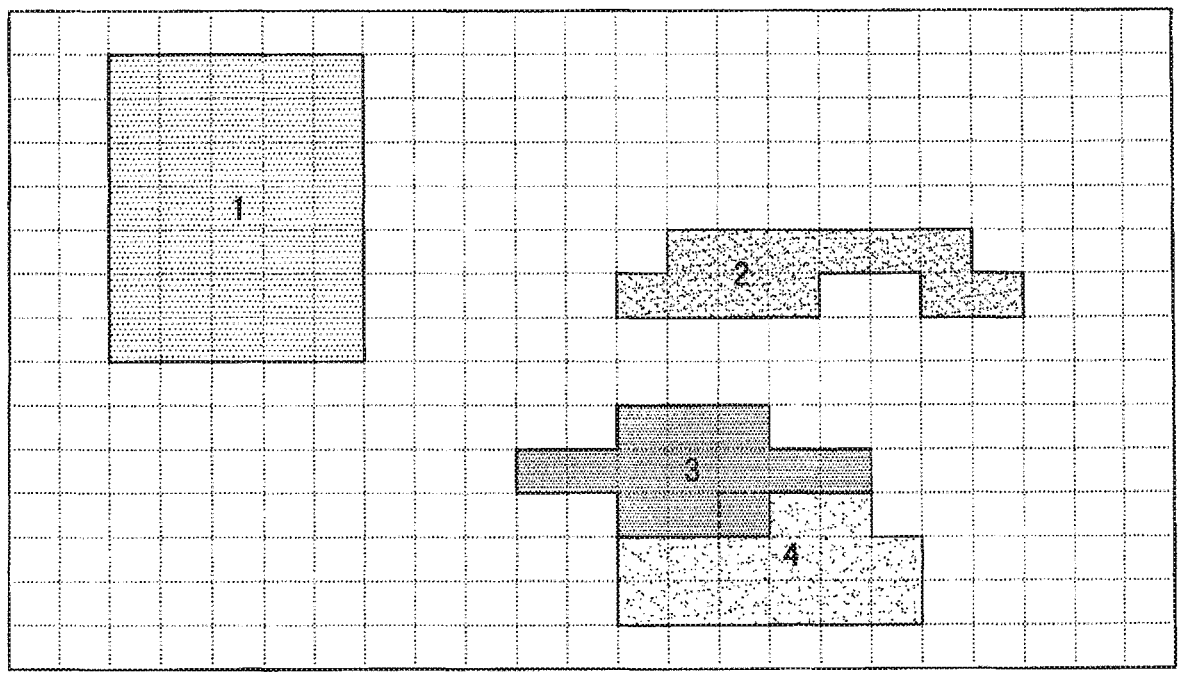

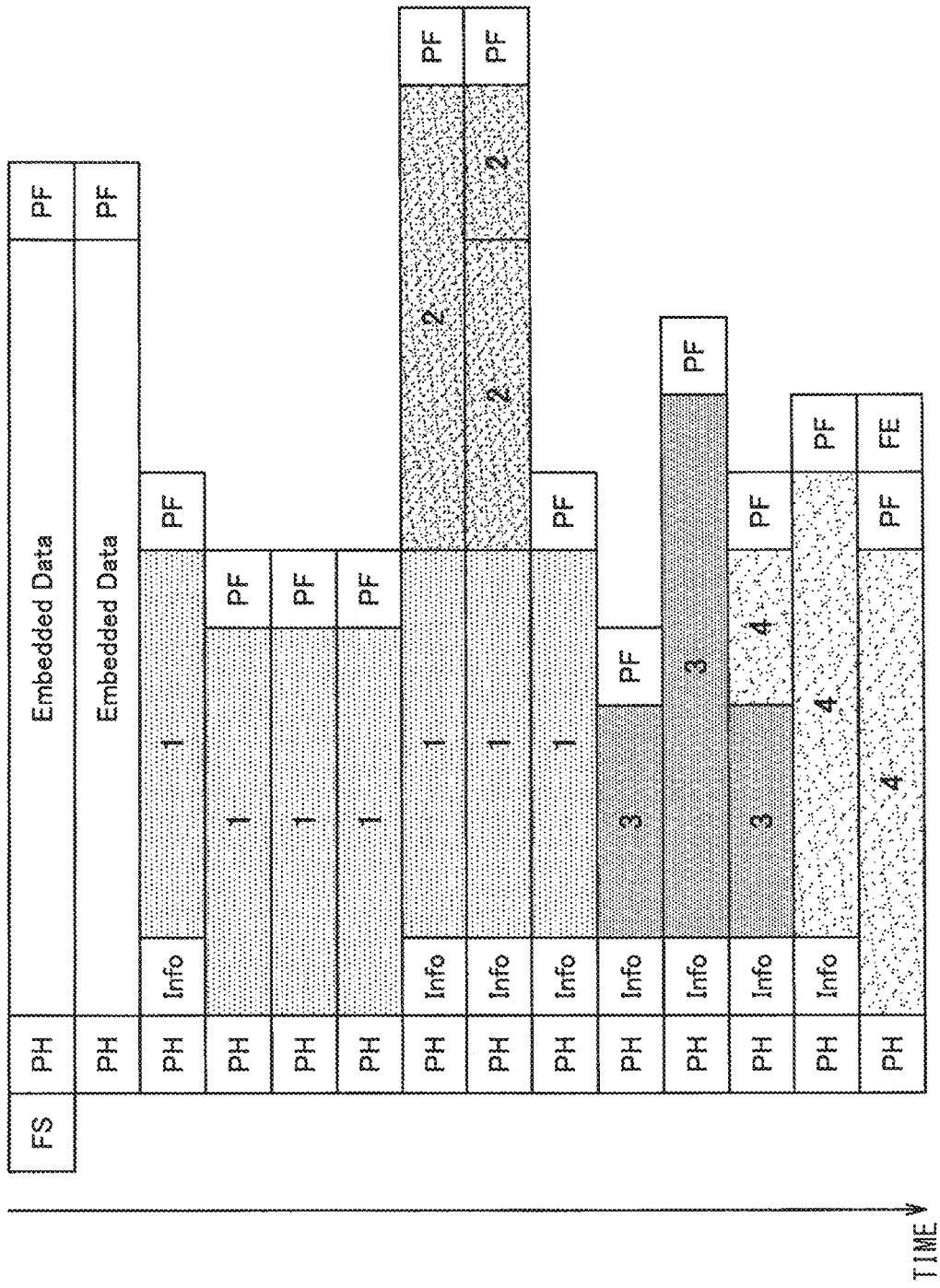
[FIG. 6]

[ FIG. 7 ]
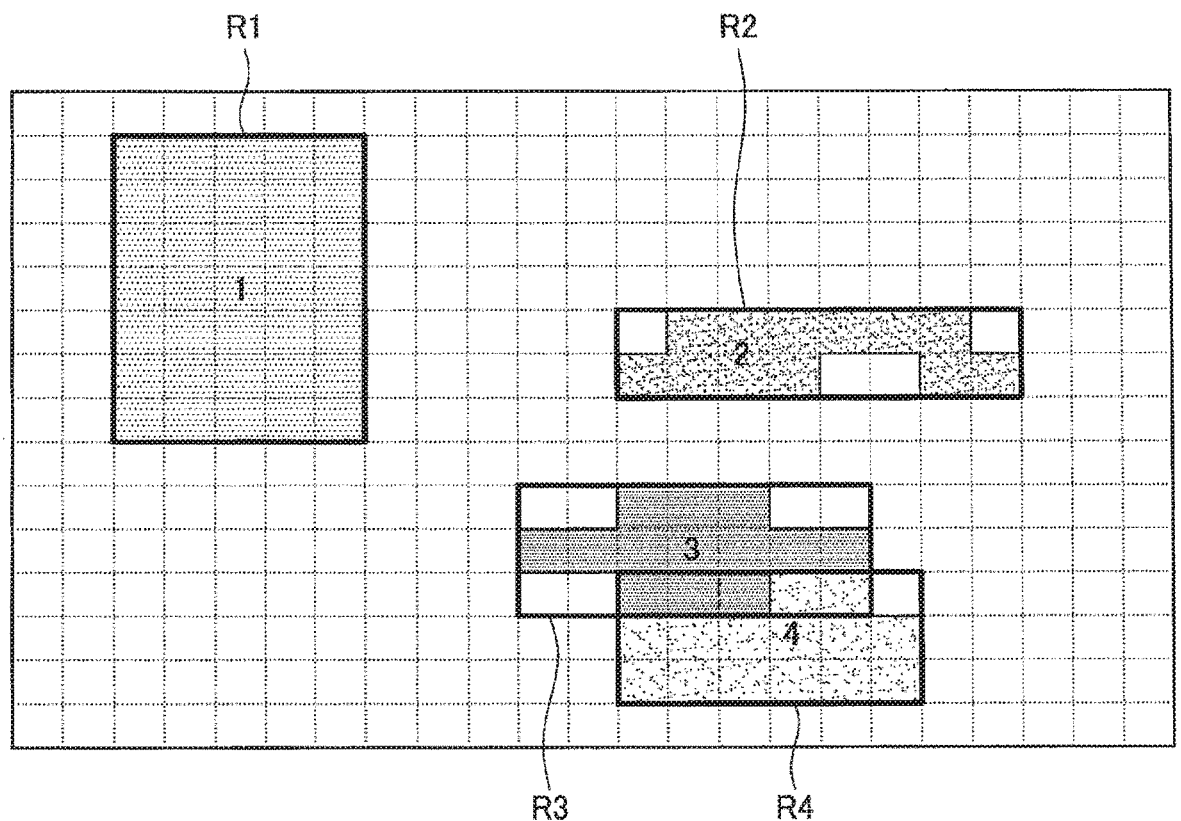

[FIG. 8]

| PH | ROI Info | ROI DATA | PF |

| ROI Info TYPE | ROI Info Parameter |

| ROI Info Type[3:0] | |
|---|---|
| 4'b0000 | SETTING UNNECESSARY |
| 4'b0001, 4'b0010, 4'b0011 | SETTING PROHIBITED |
| 4'B0100 | Num of ROI \| 1st ROI ID \| 2nd ROI ID \| ... \| Last ROI ID |
| 4'B0101 | Num of ROI \| 1st ROI ID \| 1st ROI LEN \| 2nd ROI ID \| 2nd ROI LEN \| ... \| Last ROI ID \| Last ROI LEN |
| 4'B0110 | Num of ROI \| 1st ROI ID \| 1st ROI X \| 2nd ROI ID \| 2nd ROI X \| ... \| Last ROI ID \| Last ROI X |
| 4'B0111 | Num of ROI \| 1st ROI ID \| 1st ROI X \| 1st ROI LEN \| 2nd ROI ID \| 2nd ROI X \| 2nd ROI LEN \| ... \| Last ROI ID \| Last ROI X \| Last ROI LEN |
| 4'B1000 | Y \| Last ROI ID |
| 4'b1001, 4'b1010, 4'b1011 | SETTING PROHIBITED |
| 4'B1100 | Y \| Num of ROI \| 1st ROI ID \| 2nd ROI ID \| ... \| Last ROI ID |
| 4'B1101 | Y \| Num of ROI \| 1st ROI ID \| 1st ROI LEN \| 2nd ROI ID \| 2nd ROI LEN \| ... \| Last ROI ID \| Last ROI LEN |
| 4'B1110 | Y \| Num of ROI \| 1st ROI ID \| 1st ROI X \| 2nd ROI ID \| 2nd ROI X \| ... \| Last ROI ID \| Last ROI X |
| 4'B1111 | Y \| Num of ROI \| 1st ROI ID \| 1st ROI X \| 1st ROI LEN \| 2nd ROI ID \| 2nd ROI X \| 2nd ROI LEN \| ... \| Last ROI ID \| Last ROI X \| Last ROI LEN |

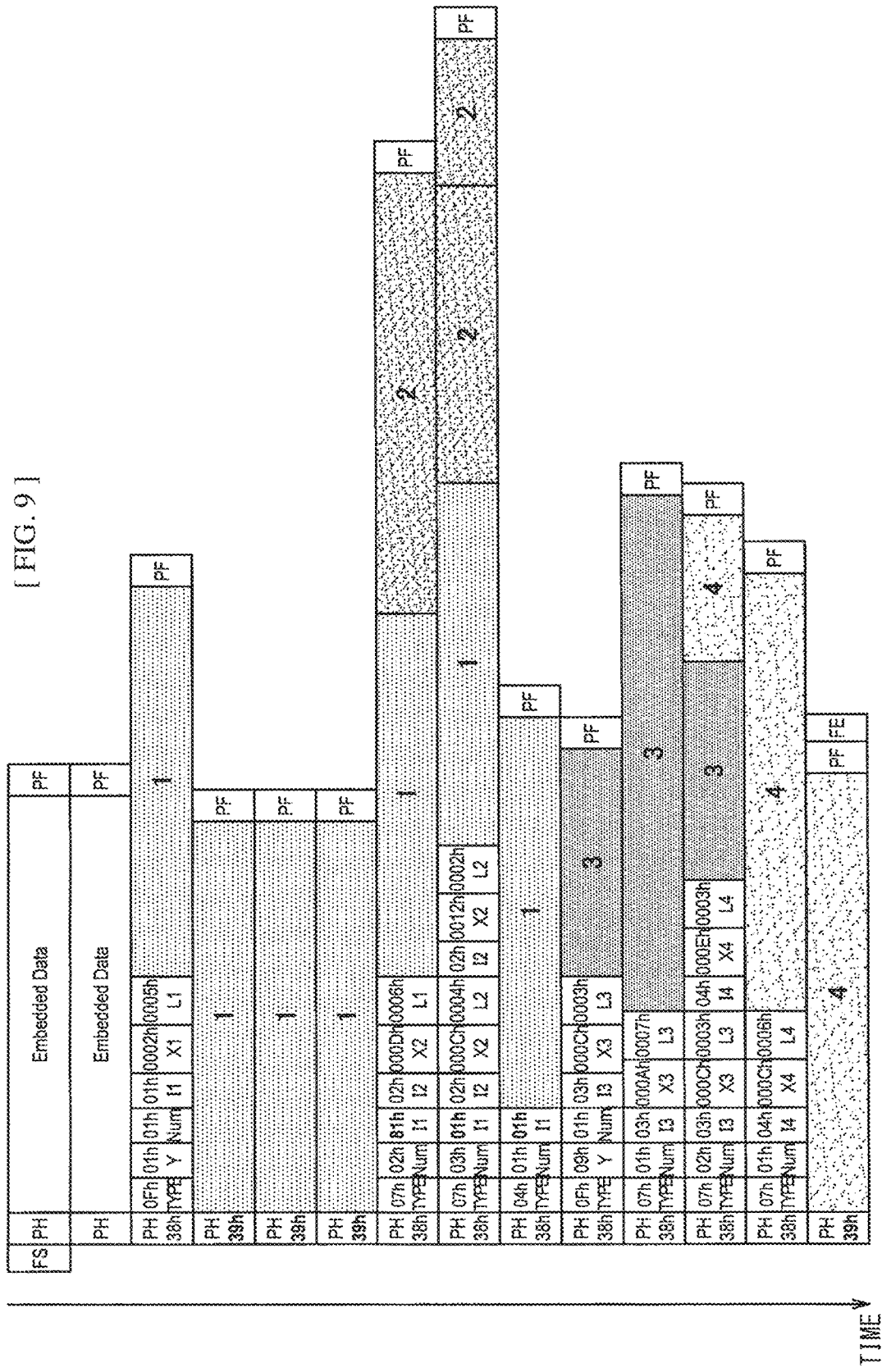
[FIG. 9]

[ FIG. 10 ]
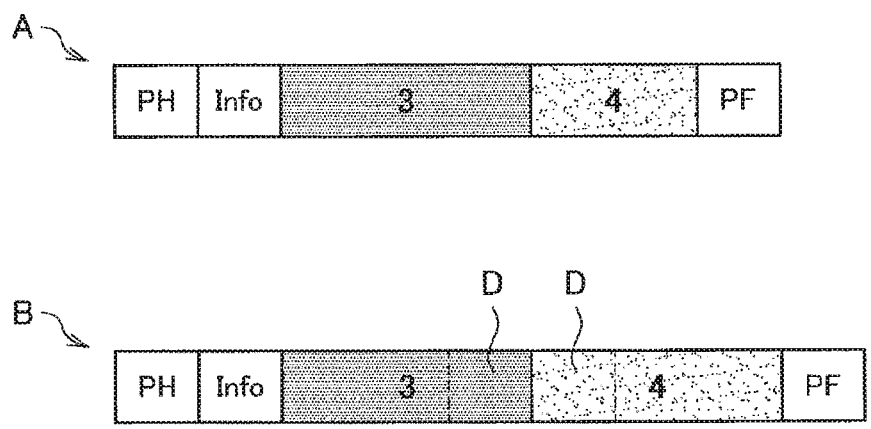

[FIG. 11]
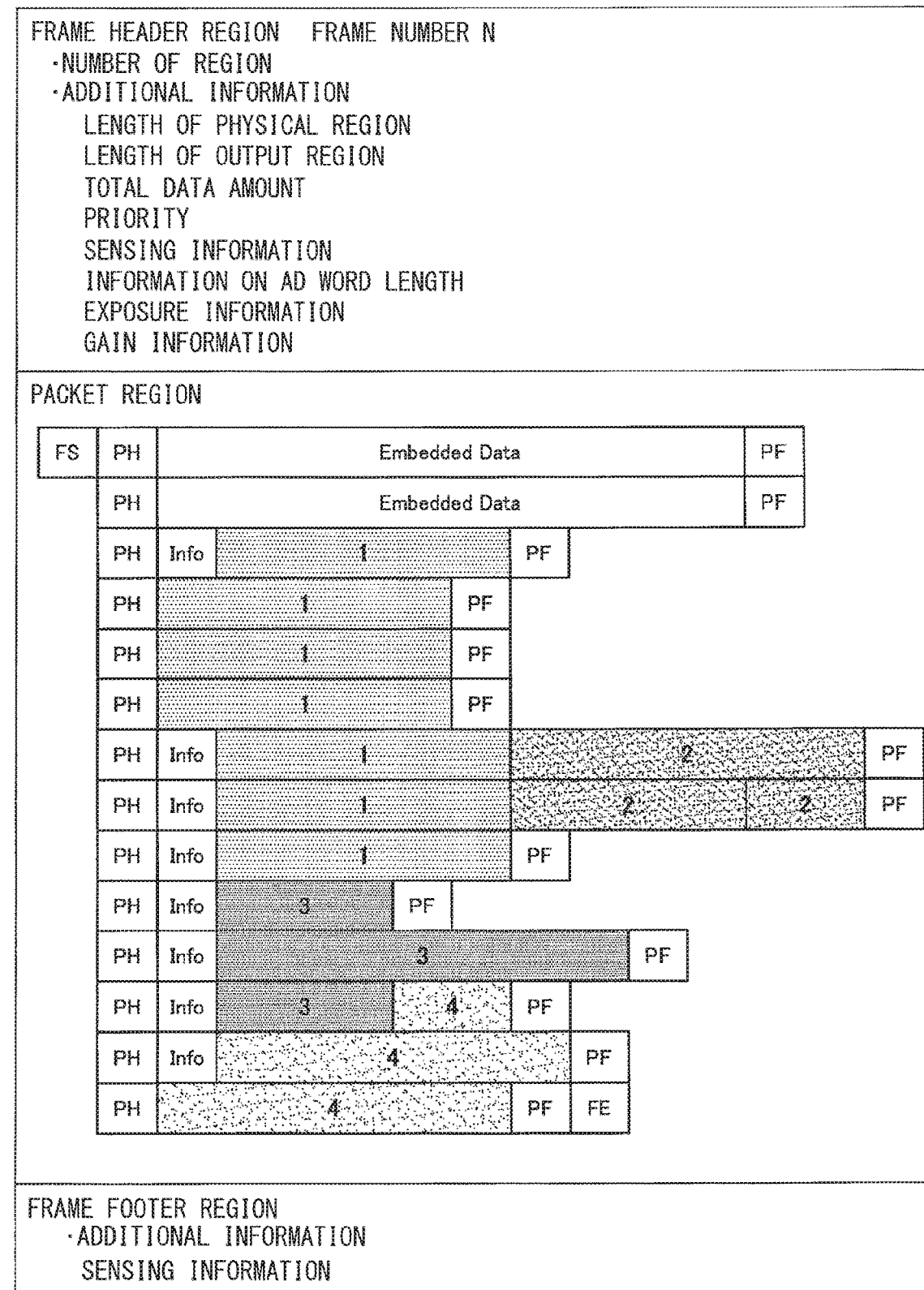

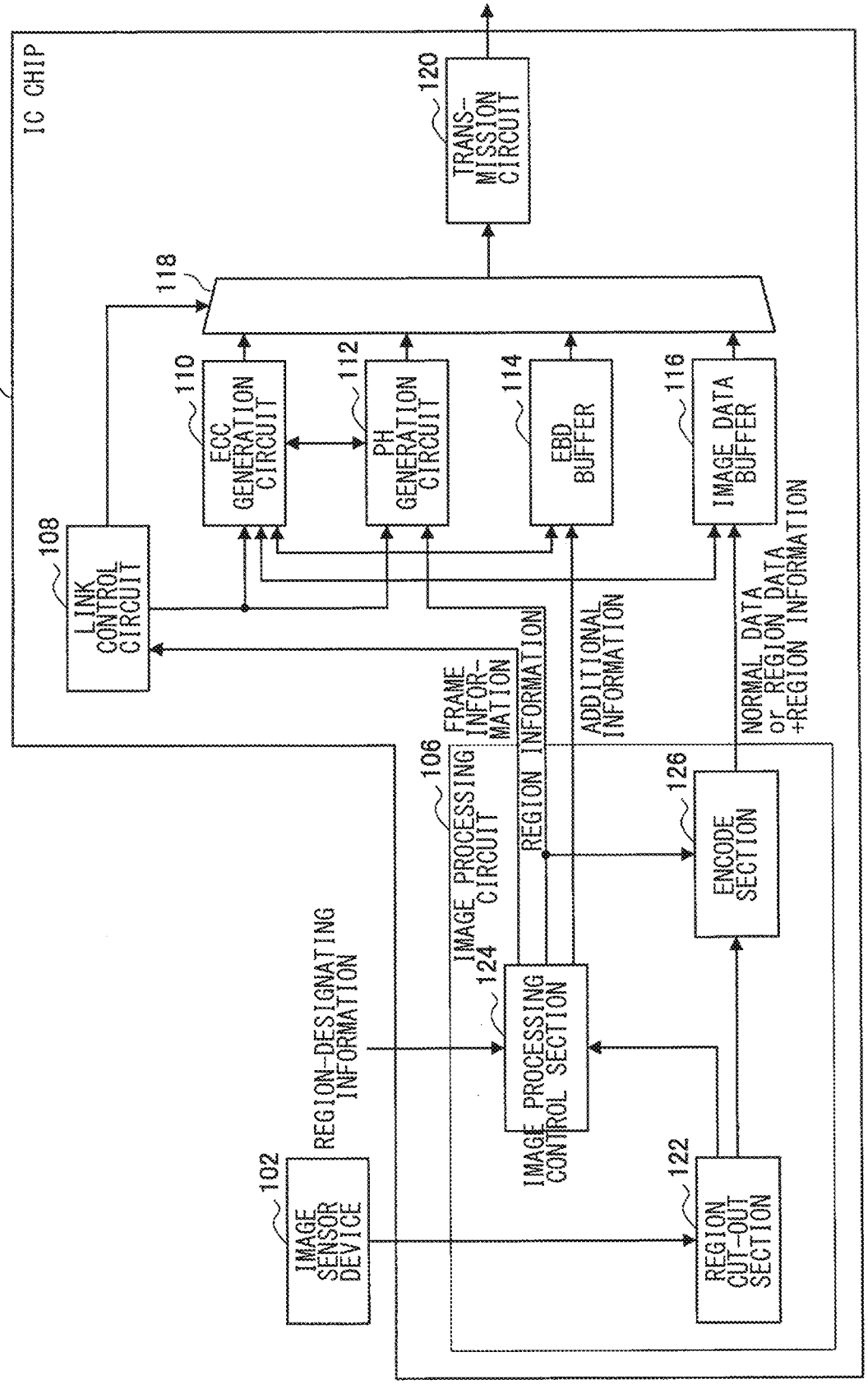

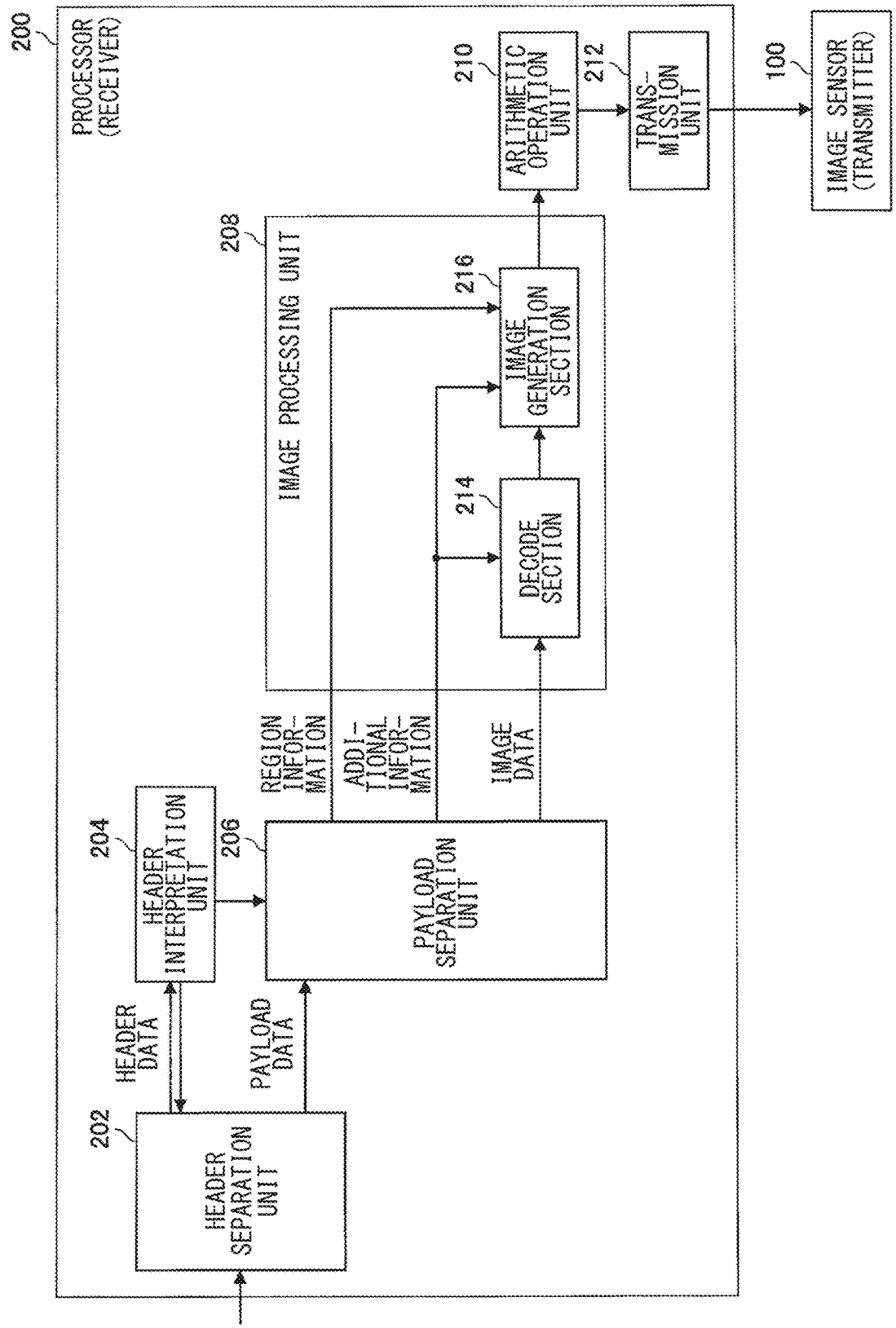
[FIG. 13]

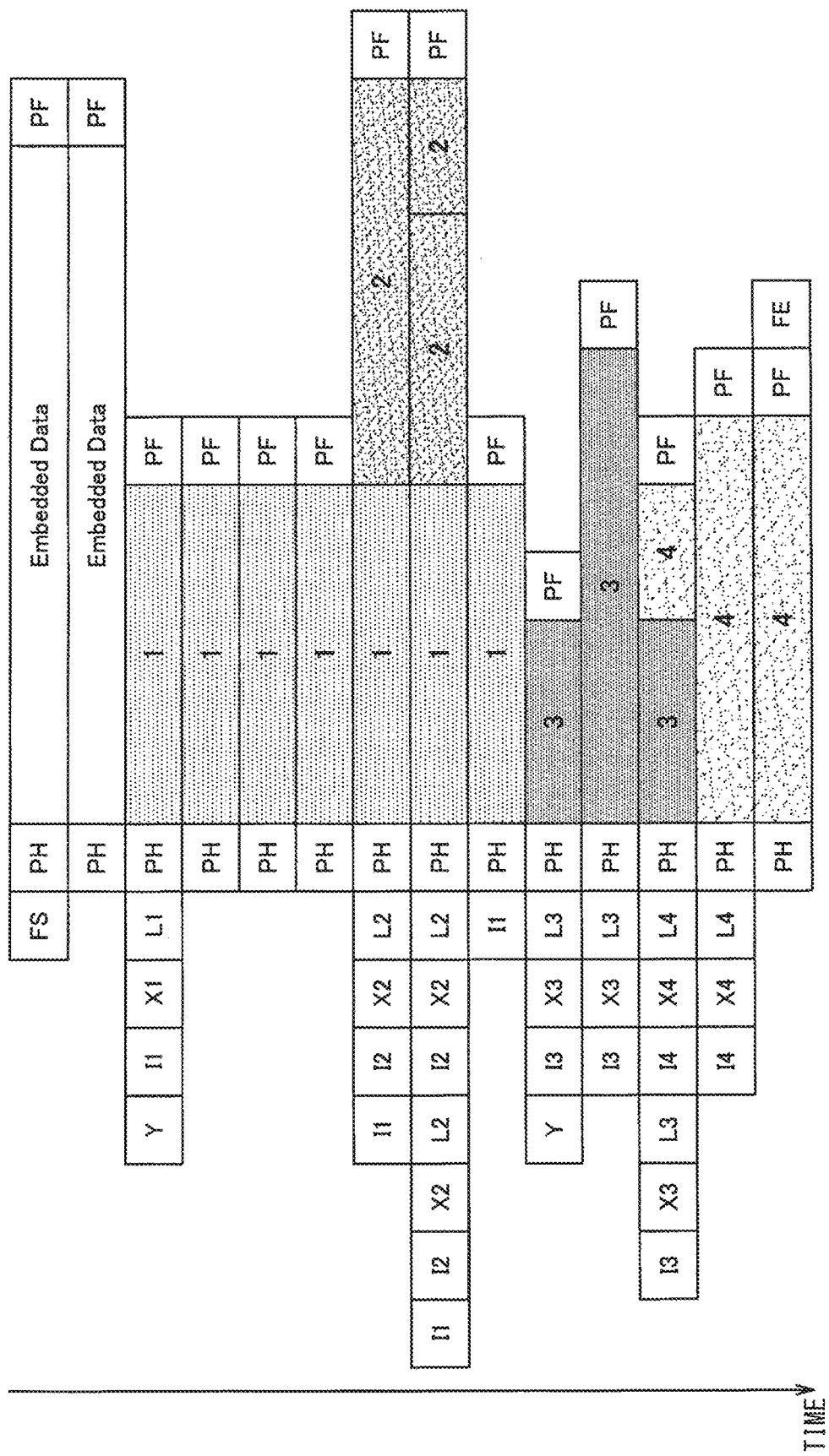
[FIG. 14]

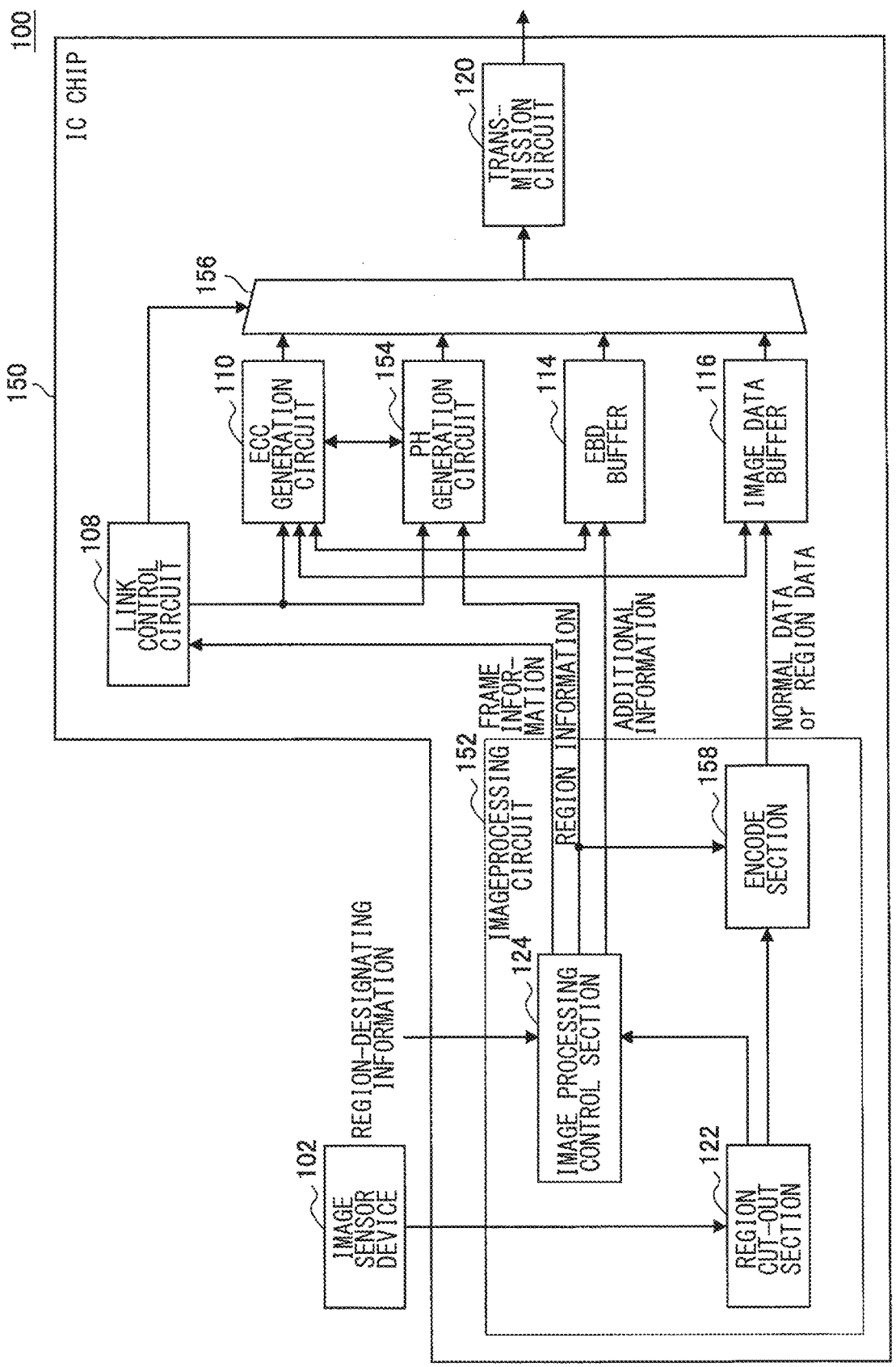
[FIG. 15]

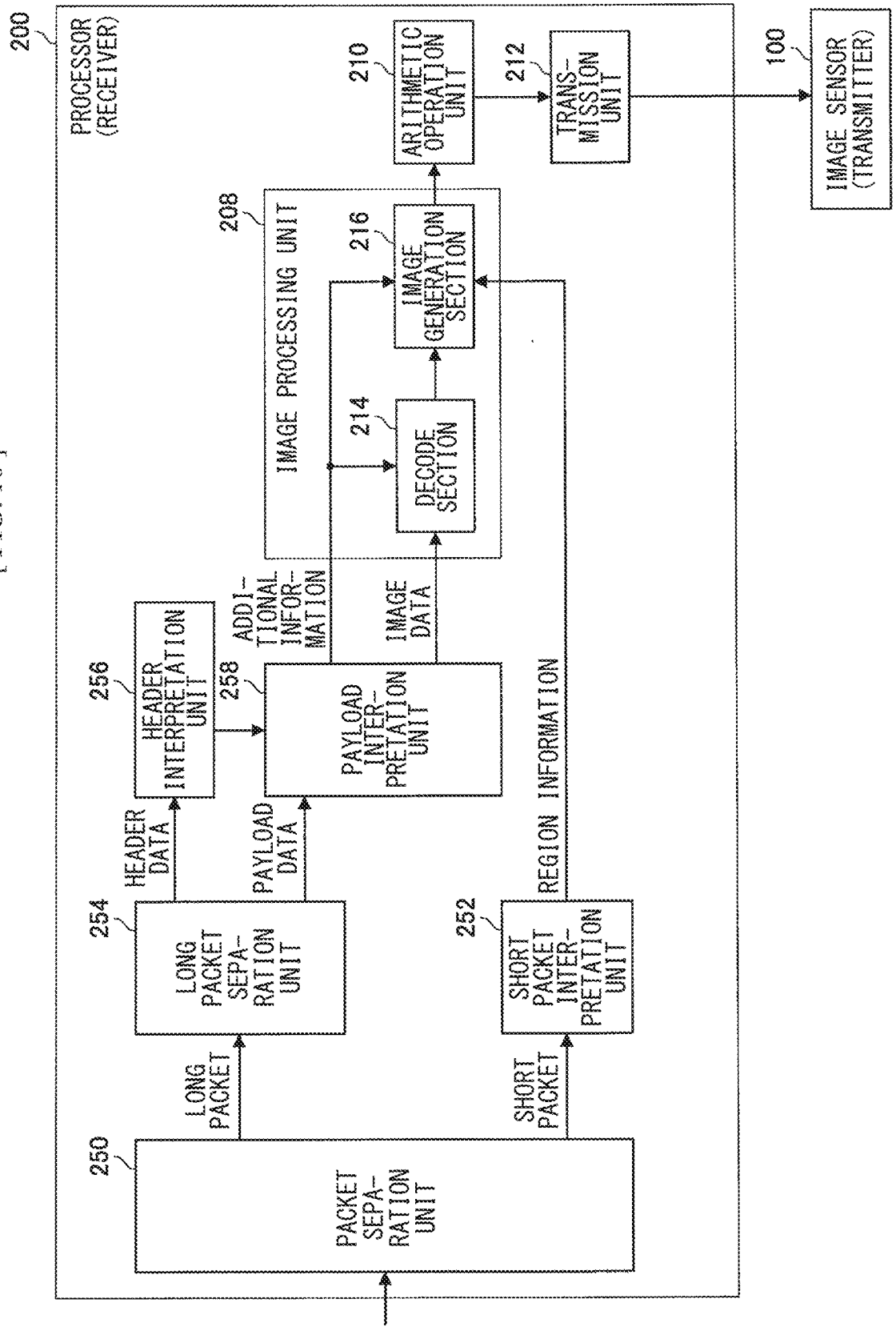
[FIG. 16]

TRANSMITTER

TECHNICAL FIELD

The present disclosure relates to a transmitter.

BACKGROUND ART

Techniques have been developed for cutting out a portion of a region in an image captured by an imaging device and transferring data of the cut-out region. Examples of the above-mentioned technique include a technique described in PTL 1 below. In addition, examples of the techniques for cutting out a portion of a region in an image include techniques described in PTLs 2 to 4 below.

CITATION LIST

Patent Literature

PTL 1: Japanese Unexamined Patent Application Publication No. 2016-201756
PTL 2: Japanese Unexamined Patent Application Publication No. 2013-164834
PTL 3: Japanese Unexamined Patent Application Publication No. 2012-209831
PTL 4: Japanese Unexamined Patent Application Publication No. 2014-39219

SUMMARY OF THE INVENTION

Problems to be Solved by the Invention

For example, in a case where a technique described in PTL 1 is used, a portion of a region is able to be cut out from an image, and data of the cut-out region is able to be transferred. Therefore, in a case where an image of the region cut out using the technique described in PTL 1 is transferred, a data amount of the transfer is reduced as compared with a data amount of transfer of the entire image, and thus transfer time is advantageously shortened.

However, the region cut out in the technique described in PTL 1 is a rectangular region, and transfer of region data of other shapes is not specifically considered. In addition, also in techniques of cutting out a portion of a region in an image described in PTLs 2 to 4, the cut-out region is a rectangular region. Accordingly, it is difficult to transfer data of a region of an arbitrary shape set for the image, even when the existing techniques of PTLs 1 to 4 are used.

The present disclosure proposes a novel and improved transmitter that is able to transmit data of a region of an arbitrary shape set for an image.

Means for Solving the Problem

According to an embodiment of the present disclosure, there is provided a transmitter including an image processor that sets region information corresponding to a region set for an image for each row in the image and that transmits the set region information and region data corresponding to the region for each row, in which the image processor sets the region by analyzing the image or on a basis of externally acquired region-designating information, and the region information includes information indicating a position of a row and information indicating a position of a column of the region included in the row.

Effects of the Invention

Accordance to an embodiment of the present disclosure, it is possible to transmit data of a region of an arbitrary shape set for an image.

It is to be noted that the above-mentioned effects are not necessarily limitative, and any of the effects set forth in the present specification or other effects that can be grasped from the present specification may be achieved in addition to or in place of the above-described effects.

BRIEF DESCRIPTION OF THE DRAWINGS

FIG. 1 is an explanatory diagram illustrating an example of a configuration of a communication system according to an embodiment of the present disclosure.

FIG. 2 is an explanatory diagram illustrating a format of a packet defined in a MIPI CSI-2 standard.

FIG. 3 is an explanatory diagram illustrating a format of a packet defined in the MIPI CSI-2 standard.

FIG. 4 is an explanatory diagram illustrating an example of a signal waveform according to transmission of a packet in the MIPI CSI-2 standard.

FIG. 5 is an explanatory diagram illustrating an example of regions set for an image.

FIG. 6 is an explanatory diagram illustrating an example of data to be transmitted by a first transmission scheme according to a transmission method according to the present embodiment.

FIG. 7 is an explanatory diagram that describes an example of Embedded Data to be transmitted by the first transmission scheme according to the transmission method of the present embodiment.

FIG. 8 is an explanatory diagram illustrating an example of a configuration of a long packet to be transmitted by the first transmission scheme according to the transmission method of the present embodiment.

FIG. 9 is an explanatory diagram illustrating an example of data to be transmitted by the first transmission scheme according to the transmission method of the present embodiment.

FIG. 10 is an explanatory diagram illustrating an example of data to be transmitted by the first transmission scheme according to the transmission method of the present embodiment.

FIG. 11 is an explanatory diagram illustrating another example of the data to be transmitted by the first transmission scheme according to the transmission method of the present embodiment.

FIG. 12 is a hardware block diagram illustrating an example of a configuration of an image sensor corresponding to the first transmission scheme according to the transmission method of the present embodiment.

FIG. 13 is a functional block diagram illustrating an example of a configuration of a processor corresponding to the first transmission scheme according to the transmission method of the present embodiment.

FIG. 14 is an explanatory diagram illustrating an example of data to be transmitted by a second transmission scheme according to the transmission method of the present embodiment.

FIG. 15 is a hardware block diagram illustrating an example of a configuration of an image sensor corresponding to the second transmission scheme according to the transmission method of the present embodiment.

FIG. 16 is a functional block diagram illustrating an example of a configuration of a processor corresponding to the second transmission scheme according to the transmission method of the present embodiment.

MODES FOR CARRYING OUT THE INVENTION

Hereinafter, preferred embodiments of the present disclosure are described in detail with reference to the accompanying drawings. It is to be noted that, in the present specification and drawings, repeated description is omitted for components substantially having the same functional configuration by assigning the same reference numerals.

In addition, hereinafter, description is given in the following order.
1. Transmission Method According to the Present Embodiment
[1] Configuration of Communication System to which Transmission Method according to the Present Embodiment is Applicable
[2] Application Example of Communication System according to the Present Embodiment
[3] Transmission Method according to the Present Embodiment
[4] Example of Effects Achieved by Using Transmission Method according to the Present Embodiment
2. Program According to the Present Embodiment
(Transmission Method According to the Present Embodiment)
[1] Configuration of Communication System to which Transmission Method according to the Present Embodiment is Applicable First, description is given of an example of a configuration of a communication system to which the transmission method according to the present embodiment is applicable.

Hereinafter, a case is exemplified where a communication scheme between devices configuring a communication system according to the present embodiment is a communication scheme conforming to MIPI (Mobile Industry Processor Interface) CSI-2 (Camera Serial Interface 2) standard. It is to be noted that the communication scheme between the devices configuring the communication system according to the present embodiment is not limited to the communication scheme conforming to the MIPI CSI-2 standard. For example, the communication between the devices configuring the communication system according to the present embodiment may be another standard established by MIPI Alliance, such as a communication scheme conforming to MIPI CSI-3 standard and a communication scheme conforming to MIPI DSI (Display Serial Interface). It is needless to say that the communication scheme to which the transmission method according to the present embodiment is applicable is not limited to the communication scheme according to the standard established in the MIPI Alliance.

FIG. 1 is an explanatory diagram illustrating an example of a configuration of a communication system 1000 according to the present embodiment. Examples of the communication system 1000 include a communication apparatus such as a smart phone, a drone (an apparatus that is operable remotely or autonomously) and a moving body such as an automobile. It is to be noted that the application example of the communication system 1000 is not limited to the examples described above. Other application examples of the communication system 1000 are described later.

The communication system 1000 includes, for example, an image sensor 100, a processor 200, a memory 300, and a display device 400.

The image sensor 100 has an imaging function and a transmission function, and transmits data representing an image generated by imaging. The processor 200 receives data transmitted from the image sensor 100 and processes the received data. That is, in the communication system 1000, the image sensor 100 serves as a transmitter, and the processor 200 serves as a receiver.

It is to be noted that. FIG. 1 illustrates the communication system 1000 including one image sensor 100, but the number of image sensors 100 included in the communication system according to the present embodiment is not limited to the example illustrated in FIG. 1. For example, the communication system according to the present embodiment may include two or more image sensors 100.

In addition. FIG. 1 illustrates the communication system 1000 including one processor 200, but the number of the processor 200 included in the communication system according to the present embodiment is not limited to the number illustrated in FIG. 1. For example, the communication system according to the present embodiment may include two or more processors 200.

In a communication system including a plurality of image sensors 100 and a plurality of processors 200, the image sensors 100 and the processors 200 may correspond on a one-to-one basis, or the plurality of image sensors 100 may correspond to one processor 200. In addition, in the communication system including the plurality of image sensors 100 and the plurality of processors 200, the plurality of processors 200 may correspond to one image sensor 100.

In the communication system including the plurality of image sensors 100 and the plurality of processors 200, communication is performed between the image sensor 100 and the processor 200, similarly to the communication system 1000 illustrated in FIG. 1.

The image sensor 100 and the processor 200 are electrically coupled by a data bus B1. The data bus B1 is a single signal transfer path that couples the image sensor 100 and the processor 200 together. For example, data representing an image (hereinafter, referred to as "image data" in some cases) transmitted from the image sensor 100 is transferred from the image sensor 100 to the processor 200 via the data bus B1.

The signal transferred by the data bus B1 in the communication system 1000 is transferred by a communication scheme conforming to a predetermined standard such as the MIPI CSI-2 standard, for example.

FIGS. 2 and 3 are each an explanatory diagram illustrating a format of a packet defined in the MIPI CSI-2 standard. FIG. 2 illustrates a format of a short packet (Short Packet) defined in the MIPI CSI-2 standard, and FIG. 3 illustrates a format of a long packet (Long Packet) defined in the MIPI CSI-2 standard.

The long packet is data including a packet header ("PH" illustrated in FIG. 3), payload ("Payload Data" illustrated in FIG. 3), and a packet footer ("PF" illustrated in FIG. 3). As illustrated in FIG. 2, the short packet is data having a structure similar to that of the packet header (PH illustrated in FIG. 3).

In both the short packet and the long packet, a VC (Virtual Channel) number ("VC" illustrated in FIGS. 2 and 3: VC value) is recorded in a header part, and an arbitrary VC number may be assigned to each packet. Packets to which the identical VC number is assigned are treated as packets belonging to the same image data.

In addition, in both of the short packet and the long packet, a DT (Data Type) value ("Data Type" illustrated in FIGS. 2 and 3) is recorded in the header part. Accordingly, similarly to the VC number, it is also possible to treat packets to which the identical DT value is assigned as packets belonging to the same image data.

In Word Count of the header part of the long packet, the end of the packet is recorded as the number of words. An error correcting code (Error Correcting Code) is recorded in ECC of the header part of the short packet and the long packet.

In the MIPI CSI-2 standard, a high-speed differential signal is used in a period in which a data signal is transferred, while a low-power signal is used in a blanking period of the data signal. In addition, a period in which the high speed differential signal is used is referred to as an HPS (High Speed State) period, while a period in which the low-power signal is used is referred to as an LPS (Low Power State) period.

FIG. 4 is an explanatory diagram illustrating an example of a signal waveform according to transmission of a packet in the MIPI CSI-2 standard. A of FIG. 4 illustrates an example of packet transfer, while B of FIG. 4 illustrates another example of the packet transfer. Each of "ST", "ET", "PH", "PF". "SP" and "PS" illustrated in FIG. 4 denotes the following meaning.

ST: Start of Transmission
ET: End of Transmission
PH: Packet Header
PF: Packet Footer
SP: Short Packet
PS: Packet Spacing It is appreciated, as illustrated in FIG. 4, that a differential signal ("LPS" illustrated in FIG. 4) in the LPS period and a differential signal (other than "LPS" illustrated in FIG. 4) in the HPS period differ from each other in the amplitude of the differential signal. Accordingly, from the viewpoint of improving transfer efficiency, it is desirable that there be no LPS period as much as possible.

The image sensor 100 and the processor 200 are electrically coupled together, for example, by a control bus B2 different from the data bus B1. The control bus B2 is another signal transfer path that couples the image sensor 100 and the processor 200 together. For example, control information outputted from the processor 200 is transferred from the processor 200 to the image sensor 100 via the control bus B2.

The control information includes, for example, information for control and a processing command. Examples of the information for control include data for controlling functions in the image sensor 100, such as one or two or more of data indicating an image size, data indicating a frame rate, and data indicating an output delay amount from the time when an image output command is received until the time when an image is outputted. In addition, the control information may include identification information indicating the image sensor 100. Examples of the identification information include any data that is able to specify the image sensor 100, such as an ID set for the image sensor 100.

It is to be noted that the information transferred from the processor 200 to the image sensor 100 via the control bus B2 is not limited to the example described above. For example, the processor 200 may transfer region-designating information that specifies a region in the images via the control bus B2. Examples of the region-designating information include data of any form that is able to specify a region, such as data indicating a position of a pixel included in the region (e.g., coordinate data in which the position of a pixel included in the region is represented by coordinates).

FIG. 1 illustrates an example in which the image sensor 100 and the processor 200 are electrically coupled together by the control bus B2; however, the image sensor 100 and the processor 200 may not necessarily be coupled by the control bus B2. For example, the image sensor 100 and the processor 200 may transmit and receive control information or the like by wireless communication of any communication scheme.

Hereinafter, description is given of respective devices configuring the communication system 1000 illustrated in FIG. 1.

[1-1] Memory 300

The memory 300 is a recording medium included in the communication system 1000. Examples of the memory 300 include a volatile memory such as a RAM (Random Access Memory), a nonvolatile memory such as a flash memory, and the like. The memory 300 is operated by electric power supplied from an internal power supply (not illustrated) configuring the communication system 1000 such as a battery, or electric power supplied from a power supply external to the communication system 1000.

The memory 300 stores, for example, an image outputted from the image sensor 100. Recording of an image into the memory 300 is controlled by, for example, the processor 200.

[1-2] Display Device 400

The display device 400 is a display device included in the communication system 1000. Examples of the display device 400 include a liquid crystal display, an organic EL display (Organic Electro-Luminescence Display: also referred to as an OLED display (Organic Light Emitting Diode Display)), and the like. The display device 400 is operated by electric power supplied from an internal power supply (not illustrated) configuring the communication system 1000 such as a battery, or electric power supplied from a power supply external to the communication system 1000.

Various images and screens, for example, an image outputted from the image sensor 100, a screen related to an application to be executed in the processor 200, a screen related to a UI (User Interface), and the like are displayed on a display screen of the display device 400. Display of images and the like on the display screen of the display device 400 is controlled by the processor 200, for example.

[1-3] Processor 200 (Receiver)

The processor 200 receives data transmitted from the image sensor 100 and processes the received data. As described above, the processor 200 serves as a receiver in the communication system 1000. An example of a configuration related to processing of data transmitted from the image sensor 100 (a configuration for serving as a receiver) is described later.

The processor 200 is configured by, for example, one or two or more processors, which are each configured by an arithmetic operation circuit such as an MPU (Micro Processing Unit), various types of processing circuits, or the like. The processor 200 operates by electric power supplied from an internal power supply (not illustrated) configuring the communication system 1000, such as a battery, or electric power supplied from a power supply external to the communication system 1000.

The processor 200 performs various types of processing, such as processing of controlling recording of image data into a recording medium such as the memory 300, processing of controlling display of an image on a display screen of the display device 400, and processing of executing any application software, for example. Examples of the processing related to the recording control include "processing of conveying control data including a recording command and data to be recorded into a recording medium to a recording medium such as the memory 300". In addition, examples of the processing related to the display control include "processing of conveying control data including a display command and data to be displayed on the display screen to a display device such as the display device 400".

In addition, the processor 200 may control functions in the image sensor 100, for example, by transmitting control information to the image sensor 100. The processor 200 is also able to control data transmitted from the image sensor 100 by, for example, transmitting the region-designating information to the image sensor 100.

[1-4] Image Sensor 100 (Transmitter)

The image sensor 100 has an imaging function and a transmission function, and transmits data representing an image generated by imaging. As described above, the image sensor 100 serves as a transmitter in the communication system 1000.

The image sensor 100 includes, for example, an image sensor device of any type that is able to generate an image, such as an "imaging device such as a digital still camera, a digital video camera, or a stereo camera", an "infrared sensor", or a "distance image sensor", and has functions of transmitting the generated image. The image generated by the image sensor 100 corresponds to data indicating a sensing result of the image sensor 100. An example of the configuration of the image sensor 100 is described later.

The image sensor 100 transmits data corresponding to a region set for the image (hereinafter, referred to as "region data") by a transmission method according to the present embodiment described later. Control related to transmission of the region data is performed by, for example, a component (described later) functioning as an image processor in the image sensor 100. A region set for an image may be called ROI (Region Of Interest) in some cases. Hereinafter, a region set for the image may be referred to as "ROI".

Examples of processing related to the setting of a region for the image include any processing that is able to specify a portion of a region in the image (or any processing that is able to cut out a portion of the region from the image), such as "processing of detecting an object from the image and setting a region including the detected object" and "processing of setting a region designated by an operation on any operation device".

The processing related to the setting of a region for the image may be performed by the image sensor 100 or may be performed by an external device such as the processor 200. In a case where the image sensor 100 performs processing related to the setting of a region for the image, the image sensor 100 specifies a region in accordance with a result of the processing related to the setting of a region for the image. In addition, for example, in a case where the processing related to the setting of a region for the image is performed at the external device, the image sensor 100 specifies a region on the basis of the region-designating information acquired from the external device.

As described above, the image sensor 100 is able to acquire the region-designating information from the processor 200 via the control bus B2. In addition, the processor 200 corresponds to a receiver to which the region data is to be transmitted from the image sensor 100, in the communication system 1000. That is, the image sensor 100 is able to specify a region on the basis of the region-designating information acquired from the receiver to which the region data is to be transmitted.

The image sensor 100 transmits the region data, i.e., transmits data of a portion of the image, thereby reducing a data amount of transfer as compared with transferring the entire image. Accordingly, the transmission of the region data performed by the image sensor 100 achieves various effects to be obtained by reduction in the data amount, such as shortening transfer time or reducing transmission load in the communication system 1000, for example.

It is to be noted that image sensor 100 is also possible to transmit data representing the entire image.

In a case where the image sensor 100 has a function of transmitting the region data and a function of transmitting data representing the entire image, the image sensor 100 is able to selectively switch between transmitting the region data and transmitting data representing the entire image.

For example, the image sensor 100 transmits the region data or the data representing the entire image in accordance with a set operation mode. The setting of the operation mode is performed, for example, by an operation or the like on an arbitrary operation device.

In addition, the image sensor 100 may selectively switch between transmitting the region data and transmitting the data representing the entire image on the basis of the region-designating information acquired from an external device. For example, the image sensor 100 transmits the region data of a region corresponding to the region-designating information when the region-designating information is acquired from the external device, and transmits the data representing the entire image when the region-designating information is not acquired from the external device.

The communication system 1000 has, for example, the configuration illustrated in FIG. 1. It is to be noted that the configuration of the communication systems according to the present embodiment is not limited to the example illustrated in FIG. 1.

For example, FIG. 1 exemplifies the image sensor 100 as a device serving as a transmitter; however, the device serving as the transmitter is not limited to the image sensor 100. For example, in a case where the communication system according to the present embodiment is configured to include an image sensor device such as the imaging device and a sender electrically coupled to the image sensor device, the sender may serve as the transmitter.

In addition, FIG. 1 exemplifies the processor 200 as a device serving as a receiver; however, the device serving as the receiver is not limited to the processor 200. For example, in the communication system according to the present embodiment, any device having a function of receiving data is able to serve as the receiver.

In addition, the communication system according to the present embodiment may not necessarily include the memory 300, in cases such as a case where an image transmitted from the image sensor 100 is stored in a recording medium external to the communication system, a case where an image transmitted from the image sensor 100 is stored in a memory included in the processor 200, or a case where an image transmitted from the image sensor 100 is not recorded.

In addition, the communication system according to the present embodiment can have a configuration in which the display device 400 illustrated in FIG. 1 is not provided.

Further, the communication system according to the present embodiment may have any configuration according to a function of a later-described electronic apparatus to which the communication system according to the present embodiment is applied.

[2] Application Example of Communication System According to the Present Embodiment Although description has been given of the communication system as the present embodiment, the present embodiment is not limited to such an embodiment. The present embodiment is applicable to various electronic apparatuses such as a communication apparatus such as a smart phone, a drone (an apparatus that is operable remotely or autonomously), a movable body such as an automobile, a computer such as a PC (Personal Computer), a tablet device, and a gaming machine, for example.

[3] Transmission Method According to the Present Embodiment

Next, description is given of a transmission method according to the present embodiment. Hereinafter, a case is exemplified where the transmission method according to the present embodiment is applied to the image sensor 100 (transmitter according to the present embodiment) illustrated in FIG. 1. The processing of the transmission method according to the present embodiment in the image sensor 100 is performed by, for example, an IC chip (described later) functioning as an image processor. It is to be noted that, in the image sensor 100, the processing of the transmission method according to the present embodiment may be performed by another component functioning as the image processor.

FIG. 5 is an explanatory diagram illustrating an example of regions set for an image. FIG. 5 illustrates, as an example of the regions, four regions: a region 1, a region 2, a region 3, and a region 4. It is needless to say that the regions set for the image are not limited to the example illustrated in FIG. 5.

As described above, in a case where the existing technique is used, it is possible to transfer data of a rectangular region such as the region 1 in FIG. 5.

However, as described above, even when the existing technique is used, it is difficult to transfer data of a region of an arbitrary shape other than the rectangular shape set for the image, such as the region 2, the region 3, and the region 4 in FIG. 5. In addition, even when the existing technique is used, it is difficult to transfer region data in a case where a plurality of regions is set in one row as in the region 1 and the region 2 in FIG. 5 and in a case where set regions overlap each other as in the region 3 and the region 4 in FIG. 5. As used herein, the row in the image means that y-coordinates are identical, when the position of a pixel is represented by two-dimensional plane coordinates (x, y).

[3-1] Basic Processing

Therefore, the image sensor 100 sets region information corresponding to a region set for the image for each row in the image.

Then, the image sensor 100 transmits the set the region information and the region data corresponding to the region for each row. The image sensor 100 transmits the region information and the region data for each row in accordance with a predetermined order such as an ascending order or a descending order of values of a y-coordinate, for example. In addition, the image sensor 100 may transmit the region information and the region data for each row in a random order.

The region information according to the present embodiment is data (data group) for specifying, on side of the receiver, a region to be set for the image. The region information includes, for example, information indicating the position of a row, identification information on a region included in the row, information indicating the position of a column of the region included in the row, and information indicating the size of the region included in the row.

It is to be noted that the information included in the region information may vary depending on a transmission scheme described later. For example, in a second transmission scheme and a third transmission scheme described later, one or both of the identification information on a region included in the row and the information indicating the size of the region included in the row may not necessarily be included. For example, in a case where a region is divided by the VC number, the VC number may serve as the identification information on a region included in the row in the second transmission scheme and the third transmission scheme described later. In addition, in a case where a region is divided by the VC number, in the second transmission scheme and the third transmission scheme described later, payload length can be substituted as the information indicating the size of the region included in the row. The following exemplifies "a case where the region information includes the information indicating the position of the row, the identification information on a region included in the row, the information indicating the position of the column of the region included in the row, and the information indicating the size of the region included in the row".

Examples of the information indicating the position of the row include any data that is able to specify a row, such as data indicating the number of the y-coordinate and data indicating the value of the y-coordinate calculated by incrementing an initial value (e.g., "0" (zero)). Hereinafter, the information indicating the position of the row may be referred to as "Y" in some cases.

Examples of the identification information on a region include any data that is able to uniquely specify a region, such as data indicating ID of a region. e.g., the number assigned to the region. Hereinafter, the identification information on a region may be referred to as "ROI ID" or "I" in some cases.

Examples of the information indicating the position of the column of the region include any data that is able to specify a column, such as data indicating the number of the x-coordinate, for example. Hereinafter, the information indicating the position of the column of the region may be referred to as "ROI X" or "X" in some cases.

Examples of the information indicating the size of the region include any data that is able to specify the size of the region in the row, such as data indicating the number of pixels of the region in the row. Hereinafter, the size of the region in the row may be referred to as "ROI length", "ROI LEN", or "L" in some cases.

For example, as described above, by setting, as the region information, the information indicating the position of the row, the identification information on the region, the information indicating the position of the column of the region, and the information indicating the size of region, it is possible for the receiver having received the region information to specify a region, the position of the region, and the ROI length. In addition, by specifying the region, the position of the region, and the ROI length, it is possible to uniquely specify at what position and with what ROI length the region is set in the row.

Thus, by setting, as the region information, the information indicating the position of the row, the identification information on the region, the information indicating the position of the column of the region, and the information indicating the size of the region, it is possible for the communication system 1000 to cope with each transmission of "region data of a rectangular region such as the region 1 in FIG. 5" and "region data of a region of an arbitrary shape other than the rectangular shape such as the region 2, the region 3, and the region 4 in FIG. 5".

In addition, the image sensor 100 may set, as the region information, the information included in the region information collectively for each region included in the row. For example, the image sensor 100 collectively sets, as the region information, the identification information on the region, the information indicating the position of the column of the region, and the information indicating the size of the region, for each region included in the row. The phrase setting as the region information collectively for each region means, for example, setting, as the region information, the identification information on the region, the information indicating the position of the column of the region, and the information indicating the size of the region (an example of information included in the region information), as a group of data.

Here, the image sensor 100 sets the region information for each row, and thus the position of the row is constant even when a plurality of regions is included. Accordingly, the image sensor 100 sets one piece of information indicating the position of the row as the region information. It is needless to say that image sensor 100 is able to collectively set the information indicating the position of the row, the identification information on the region, the information indicating the position of the column of the region, and the information indicating the size of the region for each region included in the row.

For example, as described above, by collectively setting the identification information on the region, the information indicating the position of the column of the region, and the information indicating the size of the region for each region included in the row, it is possible for the receiver having received the region information to more easily specify a region, the position of the region, and the ROI length for each region. In addition, by specifying a region, the position of the region, and the ROI length, it is possible to uniquely specify which region is set at what position and with what ROI length in the row.

Accordingly, by setting the identification information on the region, the information indicating the position of the column of the region, and the information indicating the size of the region collectively for each region included in the row, it is possible for the communication system 1000 to cope with "transfer of the region data in a case where a plurality of the regions is set in one row as in the region 1 and the region 2 in FIG. 5" and "transfer of the region data in a case where set regions overlap each other as in the region 3 and the region 4 in FIG. 5".

In addition, in a case where the set regions overlap each other as in the region 3 and the region 4 in FIG. 5, i.e., in a case where there is an overlapping part of a plurality of regions, the image sensor 100 may determine whether to transmit data of the overlapping part overlappingly. For example, the image sensor 100 determines whether the data of the overlapping part are transmitted overlappingly for each set of regions set in which the overlapping part is present. Then, when determining whether to transmit the data of the overlapping part overlappingly, the image sensor 100 transmits the data of the overlapping part overlappingly in a case of determining to transmit the data of the overlapping part overlappingly.

As used herein, the phrase transmitting the data of the overlapping part overlappingly means, for example, "causing the data of the overlapping part to be included in region data corresponding to the respective regions in which the overlapping part is present for transmission". A specific example of transmitting the data of the overlapping part overlappingly is described later.

Even in a case where the image sensor 100 transmits the data of the overlapping part overlappingly, the receiver having received the region information and the region data is able to uniquely specify the region data corresponding to the region by the region information. In addition, in a case of transmitting the data of the overlapping part overlappingly, the image sensor 100 may add a header or the like indicating a delimitation of data to more facilitate separation of the region data corresponding to the respective regions on the side of the receiver.

The transmission of the data of the overlapping part "advantageously makes it easier for a receiver having received the region data, such as the processor 200, to perform processing using the received region data"

The image sensor 100 determines whether the data of the overlapping part are transmitted overlappingly, for example, on the basis of the number of columns (the number of pixels) in the row including the overlapping part. More specifically, the image sensor 100 determines, for example, the number of columns in a case where the data of the overlapping part are transmitted overlappingly in the row including the overlapping part. Then, the image sensor 100 determines that the data of the overlapping part are transmitted overlappingly in a case where the determined number of columns is equal to or smaller than a set threshold value (or in a case where the determined number of columns is smaller than the threshold value). In addition, the image sensor 100 does not determine that the data of the overlapping part are transmitted overlappingly in a case where the determined number of columns is larger than the set threshold value (or in a case where the determined number of columns is equal to or larger than the threshold value). The threshold for determining whether to transmit the above data of the overlapping part may be a fixed value set in advance, or may be a variable value that may be changed by control or the like of the processor 200 via the control bus B2.

For example, as described above, by determining whether to transmit the data of the overlapping part overlappingly on the basis of the "number of columns in a case of transmitting the data of the overlapping part overlappingly", it is possible for the image sensor 100 to automatically switch between transmitting the data of the overlapping part overlappingly and not transmitting the data of the overlapping part overlappingly, depending on a set region. In addition, by automatically switching transmitting the data of the overlapping part and not transmitting the data of the overlapping part depending on the set region, it is possible for the image sensor 100 to transmit data that does not exceed a throughput of the receiver.

It is to be noted that the method of determining whether to transmit the data of the overlapping part overlappingly is not limited to the method of using the number of columns in the row including the overlapping part.

For example, it is also possible for the image sensor 100 to determine whether to transmit the data of the overlapping part overlappingly, on the basis of the set operation mode. For example, in a case where the operation mode is an operation mode for transmitting the data of the overlapping part overlappingly, the image sensor 100 determines that the data of the overlapping part are transmitted overlappingly. In addition, for example, in a case where the operation mode of the image sensor 100 is an operation mode in which the data of the overlapping part are not transmitted overlappingly, the image sensor 100 does not determine that the data of the overlapping part are transmitted overlappingly. The operation mode of the image sensor 100 is set by, for example, control of the processor 200 via the control bus B2.

In addition, as illustrated in the region 2 of FIG. 5 for example, a plurality of identical regions may be present in one row, depending on a region to be set. Accordingly, in a case where a plurality of identical regions is present in one row, the image sensor 100 may set the region information for the number of identical regions present. In a case where a plurality of identical regions is present in one row, the image sensor 100 sets, as the region information, for example, the identification information on the region, the information indicating the position of the column of the region, and the information indicating the size of the region, for the number of identical regions present.

For example, by setting, as the region information, the identification information on the region, the information indicating the position of the column of the region, and the information indicating the size of the region, for the number of the plurality of identical regions present in one row, it is possible for the receiver having received the region information to specify a region, the position of the region, and the ROI length, for each of the plurality of identical regions.

Accordingly, by setting the region information for the number of the plurality of identical regions present in one row, it is possible for the communication system 1000 to cope with the transfer of the region data of the region 2 in FIG. 5.

Accordingly, for example, by setting the region information including the above-described various information for each row, it is possible for the receiver having received the region information to uniquely specify a region set in the row.

It is to be noted that the information included in the region information is not limited to the examples described above. For example, the region information may include other data such as data indicating the number of regions included in the row (hereinafter, be referred to as "Num of ROI" in some cases). Specific examples of the information included in the region information are described later.

[3-2] Exceptional Processing

It is to be noted that processing according to the transmission method of the present embodiment is not limited to the basic processing described above.

(a) First Example of Exception Processing

For example, the image sensor 100 may not necessarily set, as the region information, information that has not been changed from the information included in the region information on the row to be transmitted one time before, among the information included in the region information. That is, the image sensor 100 transmits the region information including the information that has been changed from that on the row for which the region information is transmitted one time before.

As described above, by not transmitting the information that has not been changed from the information included in the region information on the row to be transmitted one time before, it is possible to further reduce a data amount of the region information. The reduction in the data amount of the region information contributes to shortening in transfer time and reduction in transmission load in the communication system 1000.

It is to be noted that there may be information set as the region information in accordance with change in another information even though the information has not been changed from the information included in the region information on the row to be transmitted one time before.

For example, when setting the information indicating the position of the column of the region as the region information, the image sensor 100 sets the identification information on the region as the region information. In addition, for example, when setting the information indicating the size of the region as the region information, the image sensor 100 sets the identification information on the region as the region information. That is, in a case where one or both of the x-coordinate of the region and the ROI length are changed from a content included in the region information on the row to be transmitted one time before, the image sensor 100 sets the identification information on the region as the region information.

In a case where one or both of the x-coordinate of the region and the ROI length are changed, the image sensor 100 sets the identification information on the region as the region information to thereby enable the receiver having received the region information to uniquely specify a region corresponding to the changed content.

(b) Second Example of Exceptional Processing

As described above, the image sensor 100 is able to transmit the region information and the region data for each row in accordance with a predetermined order. At this time, in a case where the row for transmission of the region information and the region data is a row according to the predetermined order, the image sensor 100 may not necessarily set, as the region information, the information indicating the position of the row.

Even in a case where the image sensor 100 does not set the information indicating the position of the row as the region information, the receiver is able to specify which row the received region information and region data are included in, as the region data, in accordance with the predetermined order.

[3-3] Transmission Scheme of Region Information and Region Data

The image sensor 100 transmits the region information and the region data for each row by performing, for example, the "Basic Processing illustrated in [3-1] described above", or the "Basic Processing illustrated in 13-11 described above" and the "Exceptional Processing illustrated in [3-2] described above". Next, description is given of a transmission scheme of transmitting the region information and the region data.

Examples of the transmission scheme of the region information and the region data include a first transmission scheme described in (1) below, a second transmission scheme described in (2) below, and a third transmission scheme described in (3) below.

(1) First Transmission Scheme (1-1) Processing According to First Transmission Scheme The image sensor 100 stores the region information and the region data in payload of a packet for transmission for each row.

FIG. 6 is an explanatory diagram illustrating an example of data to be transmitted by a first transmission scheme according to the transmission method of the present embodiment. FIG. 6 illustrates "examples in which the region information and the region data corresponding to each of the region 1, the region 2, the region 3, and the region 4 illustrated in FIG. 5 are stored in the payload of the long packet of the MIPI illustrated in FIG. 3 and transmitted for each row".

"FS" illustrated in FIG. 6 is an FS (Frame Start) packet in the MIPI CSI-2 standard, and "FE" illustrated in FIG. 6 is an FE (Frame End) packet in the MIPI CSI-2 standard (the same applies also to other diagrams).

"Embedded Data" illustrated in FIG. 6 is data embeddable in a header or a footer of data to be transmitted. Examples of the "Embedded Data" include additional information that is additionally transmitted by the image sensor 100. Hereinafter, the Embedded Data may be referred to as "EBD" in some cases.

Examples of the additional information according to the present embodiment include one or two or more of information indicating a data amount of the region, the information indicating the size of the region, and information indicating priority of the region.

Examples of the information indicating the data amount of the region include data of any form that is able to specify the data amount of the region, such as "data indicating the number of pixels (or the data amount of the region) included in the region and the data amount of the header". Transmission of information indicating the data amount of the region as the "Embedded Data" illustrated in FIG. 6 enables the receiver to specify the data amount of each region. That is, the transmission of the information indicating the data amount of the region as the "Embedded Data" illustrated in FIG. 6 enables the receiver to specify the data amount of the region even in a case where the receiver has no function of calculating the data amount of each region on the basis of the region information.

Examples of the information indicating the size of the region include data of any form that is able to specify the size of the region, such as "data indicating a rectangular region including the region (e.g., data indicating the number of pixels in a horizontal direction and the number of pixels in a vertical direction in the rectangular region)".

The information indicating priority of the region is, for example, data to be used in processing of the region data. As an example, priority indicated by the information indicating priority of the region is utilized for an order in which the region is processed, or for processing in a case where the set regions overlap each other as in the region 3 and the region 4 in FIG. 5.

It is to be noted that the additional information according to the present embodiment is not limited to the examples described above. Examples of the additional information according to the present embodiment include various types of data such as exposure information indicating an exposure value in the image sensor device and gain information indicating a gain in the image sensor device. The exposure value indicated by the exposure information and the gain indicated by the gain information are each set in the image sensor device under the control of the processor 200 via the control bus B2.

FIG. 7 is an explanatory diagram that describes an example of the Embedded Data to be transmitted by the first transmission scheme according to the transmission method of the present embodiment. FIG. 7 illustrates an example in which information indicating the size of a region is transmitted as the "Embedded Data" illustrated in FIG. 6, and the information indicating the size of the region to be transmitted is data indicating the smallest rectangular region including the region. In addition, FIG. 7 illustrates an example in which four regions: a region 1, a region 2, a region 3, and a region 4 are set, similarly to FIG. 5.

The transmission of information indicating the size of the region as the "Embedded Data" illustrated in FIG. 6 enables the receiver to specify the smallest rectangular region including the region 1 illustrated in R1 of FIG. 7, the smallest rectangular region including the region 2 illustrated in R2 of FIG. 7, the smallest rectangular region including the region 3 illustrated in R3 of FIG. 7, and the smallest rectangular region including the region 4 illustrated in R4 of FIG. 7. That is, the transmission of the information indicating the size of the region as the "Embedded Data" illustrated in FIG. 6 enables the receiver to specify the smallest rectangular region including each region on the basis of the region information, even in a case where the receiver has no function of specifying the smallest rectangular region including each region on the basis of the region information. It is needless to say that the information indicating the size of the region is not limited to data indicating the smallest rectangular region including each region.

Examples of the information indicating priority of the region include data of any form that is able to specify priority of the region, such as data in which ROI IDs are arranged in a descending order of priority and data in which ROI IDs are arranged in an ascending order of priority. Transmission of the information indicating priority of the region as the "Embedded Data" illustrated in FIG. 6 enables the receiver to specify, for example, the processing order of regions and which region is preferentially processed. That is, the transmission of the information indicating priority of the region as the "Embedded Data" illustrated in FIG. 6 makes it possible to control the processing of the region in the receiver.

It is needless to say that each example of the information indicating the data amount of the region, the information indicating the size of the region, and the information indicating priority of the region, which are transmitted as the "Embedded Data" illustrated in FIG. 6, is not limited to the examples described above.

The "PH" illustrated in FIG. 6 is a packet header of a long packet. Here, the packet header of the long packet according to the first transmission scheme may function as data (change information) indicating whether or not the information included in the region information has been changed from region information included in a packet to be transmitted one time before. That is, it is deemed that the "PH" illustrated in FIG. 6 is single data indicating the data type of the long packet.

As an example, in a case where the information included in the region information has been changed from the region information included in a packet to be transmitted one time before, the image sensor 100 sets "0x38" to the "PH". In this case, the image sensor 100 stores the region information in the payload of the long packet.

As another example, in a case where the information included in the region information has not been changed from the region information included in the packet to be transmitted one time before, the image sensor 100 sets "0x39" to the "PH". In this case, the image sensor 100 does not store the region information in the payload of the long packet. That is, in a case where the information included in the region information has not been changed from the region information included in the packet to be transmitted one time before, the image sensor 100 does not cause the region information to be transmitted.

It is needless to say that the data set to the "PH" is not limited to the examples described above.

"Info" illustrated in FIG. 6 is region information to be stored in the payload (the same applies also to other diagrams). As illustrated in FIG. 6, the region information is stored in the head part of the payload. Hereinafter, the region information may be referred to as "ROI Info" in some cases.

"1", "2", "3", and "4" illustrated in FIG. 6 corresponds, respectively, to region data of the region 1, region data of the region 2, region data of the region 3, and region data of the region 4 which are stored in the payload (the same applies also to other diagrams). It is to be noted that, in FIG. 6, each region data is illustrated in a delimited manner, which represents a delimitation for the sake of convenience, but there is no delimitation between the data stored in the payload (the same applies also to other diagrams). Hereinafter, the region data may be referred to as "ROI DATA" in some cases.

FIG. 8 is an explanatory diagram illustrating an example of a configuration of a long packet to be transmitted by the first transmission scheme according to the transmission method of the present embodiment.

"ROI Info Type" illustrated in FIG. 8 is data indicating a transfer form of "ROI Info Parameter". Setting the "ROI Info Type" enables the receiver having received the region information to uniquely specify the content of the "ROI Info Parameter".

In addition, the "ROI Info Type" corresponds to another data indicating the data type of the long packet. That is, in the long packet according to the first transmission scheme, two types of the "PH" and the "ROI Info Type" are defined as the data types of the long packet.

"ROI Info Type" is data of 1 [byte], for example, and has the following meanings when expressed in Verilog-HDL representation. It is needless to say that the "ROI Info Type" is not limited to data of 1 [byte].

[7: 4] . . . Reserved

[3] . . . "1'b1": transfer Y, "1'b0": not transfer Y

[2] . . . "1'b1": transfer ROI ID, "1'b0": not transfer ROI ID

[1] . . . "1'b1": transfer X, "1'b0": not transfer X

[0] . . . "1'b1": transfer ROI length. "1'b0": not transfer ROI length

In addition, the "ROI Info Parameter" illustrated in FIG. 8 stores data according to the "ROI Info Type".

It is to be noted that the region information according to the first transmission scheme may include, for example, a flag indicating that both the x-coordinate of the region and the ROI length have not been changed (hereinafter, referred to as "NO CHANGE flag") from the region information included in the packet to be transmitted one time before. In a case of indicating that NO CHANGE flag has not been changed (e.g., in a case where NO CHANGE flag is 1'b1), the above [1] and the above [0] of the "ROI Info Type" may be omitted.

Examples of the NO CHANGE flag include MSB (Most Significant Bit) of the ROI ID. It is to be noted that the NO CHANGE flag may be data different from the ROI ID.

FIG. 9 is an explanatory diagram illustrating an example of data to be transmitted by the first transmission scheme according to the transmission method of the present embodiment, and specifically illustrates the data illustrated in FIG. 6 in accordance with the configuration of the long packet illustrated in FIG. 8.

In the first transmission scheme, the region information and the region data corresponding to each of the region 1, the region 2, the region 3, and the region 4 illustrated in FIG. 5 are stored in the payload of the long packet of the MIPI as illustrated in FIG. 9, for example, and are transmitted for each row.

As described above, the image sensor 100 is able to transmit one or two or more of the information indicating the data amount of the region, the information indicating the size of the region, and the information indicating priority of the region (examples of additional information) as the "Embedded Data" illustrated in FIG. 6.

In addition, as described above, in a case where there is an overlapping part in which a plurality of the regions overlap each other as in the region 3 and the region 4 in FIG. 5, the image sensor 100 may determine whether to transmit the data of the overlapping part overlappingly to transmit the data of the overlapping part overlappingly depending on a result of the determination.

FIG. 10 is an explanatory diagram illustrating an example of data to be transmitted by the first transmission scheme according to the transmission method of the present embodiment. A of FIG. 10 illustrates an example of a case where the image sensor 100 does not transmit the data of the overlapping part in the region 3 and the region 4 of FIG. 5 overlappingly. In addition. B of FIG. 10 illustrates an example of a case where the image sensor 100 transmits the data of the overlapping part in the region 3 and the region 4 of FIG. 5 overlappingly. In B of FIG. 10, a part represented by a symbol D corresponds to the data of the overlapping part in the region 3 and the region 4.

It is to be noted that the example of data to be transmitted by the first transmission scheme is not limited to the examples illustrated in FIG. 6. FIG. 11 is an explanatory diagram illustrating another example of data to be transmitted by the first transmission scheme according to the transmission method of the present embodiment.

A frame is divided into, for example, a frame header region, a packet region, and a frame footer region.

The frame header region includes frame number which serves as an identifier of a frame. In addition, the frame header region may include the number of regions set for an image and additional information. That is, in the first transmission scheme, the additional information is not limited to that to be transmitted as the "Embedded Data". FIG. 11 illustrates examples in which the following information is transmitted as the additional information.

Length of physical region: e.g., the number of pixels of an image sensor device

Length of output region: e.g., the number of pixels of an image to be outputted from the image sensor device (length on an image)

Total data amount: e.g., data amount of a packet region

Priority: priority of a region

Sensing information: e.g., data for processing an image corresponding to a region, such as content of arithmetic operation of an object included in a region Information on AD word length: word length in ADC Exposure information Gain information In the packet region, the region information and the region data are transmitted for each row, similarly to FIG. 6.

The frame footer region may include data similar to that in the frame header region, such as additional information.

Also in the example illustrated in FIG. 11, the region information and the region data are able to be transferred for each row, similar to the examples illustrated in FIG. 6.

(1-2) Feature and Advantage of First Transmission Scheme

The first transmission scheme according to the transmission method of the present embodiment has, for example, the following features. It is needless to say that the features of the first transmission scheme according to the transmission method of the present embodiment are not limited to the examples described below.

Transmit additional information using EBD, and transmit region information corresponding to a set region using payload.

Transmit only information corresponding to a change point among information included in region information Able to cope with a region of an arbitrary shape In addition, in the first transmission scheme, the region information transmitted while being stored in the head part of the payload has the following features, for example. It is needless to say that the features of the region information according to the first transmission scheme are not limited to the examples described below.

Two data types of a long packet are defined for region transfer

One of them is used when transferring region information (e.g., data indicating "0x38")

The other of them is used in a case where region information is identical to region information included in a packet to be transmitted one time before (e.g., data indicating "0x39").

Transmit parameter transfer form because of no delimitation unlike a short packet according to the second transmission scheme described later Transfer information on a plurality of identical regions present in one row by transmitting identification information on the identical regions for the number of the plurality of identical regions present in a case where the plurality of identical regions is present in one row Information indicating a position of a row (Y)

Incremented by an initial value 0 (zero)

Transmitted when not transmitted in accordance with a predetermined order (e.g., when thinned out)

NO CHANGE flag

Utilize MSB of identification information on a region (ROI ID) for transmission

Identification information on a region (I)

Transmitted when a region is increased or decreased

Transmit in a case where a position of a column of a region or ROI length are changed Information (X) indicating a position of a column of a region Initial value 0 (zero)

Transmitted when changed

Transmitted as a set with identification information on a region

Information indicating size of a region (L)

Surely set in a row that is first to be transmitted

Transmitted when changed

Transmitted as a set with identification information on a region

In addition, the first transmission scheme has, for example, the following advantages.

High transfer efficiency

Backward compatibility with already-defined CSI-2 standard

Able to transfer shape of any region (ROI)

(1-3) Configuration Example According to First Transmission Scheme

Next, description is given of an example of the configuration of the image sensor 100 corresponding to the first transmission scheme described above and an example of a configuration of the processor 200 corresponding to the first transmission scheme (example of the configuration related to the processing of data transmitted from the image sensor 100).

(1-3-1) Configuration of Image Sensor 100 (Transmitter) Corresponding to First Transmission Scheme FIG. 12 is a hardware block diagram illustrating an example of the configuration of the image sensor 100 corresponding to the first transmission scheme according to the transmission method of the present embodiment. The image sensor 100 includes, for example, an image sensor device 102 and an IC chip 104. The image sensor 100 illustrated in FIG. 12 operates by electric power supplied from the internal power supply (not illustrated) configuring the communication system 1000 such as a battery, or electric power supplied from the power supply external to the communication system 1000.

The image sensor device 102 is an image sensor device of any form that is able to generate an image, such as "an imaging device such as a digital still camera", "an infrared sensor", or "a distance image sensor".

As an example, an imaging device functioning as the image sensor device 102 includes a lens/imaging element and a signal processing circuit.

The lens/imaging element includes, for example, an optical system lens and an image sensor using a plurality of imaging elements such as a CMOS (Complementary Metal Oxide Semiconductor) and a CCD (Charge Coupled Device).

The signal processing circuit includes, for example, an AGC (Automatic Gain Control) circuit and an ADC (Analog to Digital Converter), and converts an analog signal generated by the imaging element into a digital signal (image data). In addition, the signal processing circuit performs various types of processing related to RAW development, for example. Further, the signal processing circuit may perform various types of signal processing such as White Balance correction processing, color tone correction processing, gamma correction processing, YCbCr transformation processing, and edge enhancement processing, for example.

In addition, the signal processing circuit may perform processing related to the setting of a region for an image, and convey the region-designating information to the IC chip 104. Further, the signal processing circuit may convey various types of data such as the exposure information and the gain information to the IC chip 104.

A signal indicating the image generated by the image sensor device 102 is conveyed to the IC chip 104. It is to be noted that, in a case where the signal indicating the image conveyed from the image sensor device 102 to the IC chip 104 is an analog signal, for example, the IC chip 104 converts the analog signal into a digital signal by an ADC included therein, and processes the image data obtained by the conversion. In the following, a case is exemplified where the image data is conveyed from the image sensor device 102 to the IC chip 104.

The IC chip 104 is a chip-shaped IC (Integrated Circuit) on which a circuit involving a data transmission function according to the first transmission scheme is integrated, and processes image data conveyed from the image sensor device 102 and transmits data corresponding to the generated image. The data corresponding to the image is image data conveyed from the image sensor device 102 (i.e., data representing the entire image), or the region information and the region data. It is to be noted that the circuit involving the function of transmitting data by the first transmission scheme is not limited to achievement in the form of one IC chip, but may be formed by a plurality of the IC chips.

The IC chip 104 includes, for example, an image processing circuit 106, a LINK control circuit 108, an ECC generation circuit 110, a PH generation circuit 112, an EBD buffer 114, an image data buffer 116, a synthesizing circuit 118, and a transmission circuit 120.

The image processing circuit 106 is a single circuit having a function of performing processing related to the transmission method according to the present embodiment. In a case where the processing according to the transmission method of the present embodiment is performed, the image processing circuit 106 sets the region information for each row in the image, and causes the LINK control circuit 108, the ECC generation circuit 110, the PH generation circuit 112, the EBD buffer 114, the image data buffer 116, the synthesizing circuit 118, and the transmission circuit 120 to transmit the set region information and the region data corresponding to the region for each row by the first transmission scheme. In addition, the image processing circuit 106 is also able to cause the image data to be conveyed from the image sensor device 102 (i.e., data representing the entire image) to be transmitted for each row.

Examples of the image processing circuit 106 include a processor such as the MPU.

Description is given of functions of the image processing circuit 106 by dividing them into functional blocks. As illustrated in FIG. 12, the image processing circuit 106 includes, for example, a region cut-out section 122, an image processing control section 124, and an encode section 126.

The region cut-out section 122 serves to perform processing related to the setting of a region for an image, and sets a region (ROI) for the image indicated by the image data conveyed from the image sensor device 102. For example, the region cut-out section 122 performs processing related to the setting of the region for the image in accordance with a set operation mode. For example, in a case where the operation mode is an operation mode for transmitting the region data, the region cut-out section 122 performs processing related to the setting of the region for the image. In addition, in a case where the operation mode is an operation mode for transmitting the data representing the entire image, the region cut-out section 122 performs no processing related to the setting of the region for the image.

For example, the region cut-out section 122 detects an object by performing an optional object-detecting processing on the image, and sets a region including the detected object for each detected object. In addition, the region cut-out section 122 may set a region designated by an operation or the like on any of the operation devices. Examples of the region set by the region cut-out section 122 may include a rectangular region as illustrated in the region 1 in FIG. 5, and a region of an arbitrary shape other than the rectangular shape set for the image, such as the region 2, the region 3, and the region 4 in FIG. 5.

In a case where the region is set, the region cut-out section 122 conveys the region-designating information indicating, for example, the set region to the image processing control section 124. In addition, in a case where no region is set, the region cut-out section 122 does not convey the region-designating information to the image processing control section 124.

In addition, the region cut-out section 122 conveys the image data conveyed from the image sensor device 102 to the encode section 126.

The image processing control section 124 serves to perform processing related to the transmission method according to the present embodiment, sets region information for each row in the image, and conveys the set region information to the encode section 126 and the PH generation circuit 112.

The image processing control section 124 specifies a region included in each row in the image on the basis of, for example, the region-designating information acquired from the region cut-out section 122 or the region-designating information acquired from an external device (not illustrated). Then, the image processing control section 124 sets the region information for each row on the basis of the specified region. At this time, the image processing control section 124 may not necessarily set, as the region information, information that has not been changed from the information included in the region information on the row to be transmitted one time before, as illustrated in the Exceptional Processing described above.

In addition, in a case where the region-designating information is not acquired, the image processing control section 124 sets no region information.

It is to be noted that the processing in the image processing control section 124 is not limited to the examples described above.

For example, the image processing control section 124 may generate frame information, and convey the generated frame information to the LINK control circuit 108, for example. Examples of the frame information include the number of the VC assigned to each frame. In addition, examples of the frame information may include data indicating a data type, such as YUV data. RGB data, or RAW data.

In addition, for example, the image processing control section 124 may perform processing of setting additional information, and transmit the set additional information to the EBD buffer 114.

Examples of the processing of setting the additional information include processing of generating the additional information. Examples of the processing of generating the additional information include one or two or more of processing of generating the information indicating the data amount of the region, processing of generating the information indicating the size of the region, and processing of generating the information indicating priority of the region.

It is to be noted that the processing of setting the additional information is not limited to the processing of generating the additional information. For example, the image processing control section 124 may set, as the additional information, information acquired from the image sensor device 102, such as the exposure information and the gain information. In addition, for example, the image processing control section 124 may set, as the additional information, data related to various region, such as data indicating length of a physical region, data indicating length of an output region, data indicating an image format, and data indicating a total amount of data.

The encode section 126 encodes the image data conveyed from the image sensor device 102 in a predetermined scheme such as a scheme corresponding to a JPEG (Joint Photographic Experts Group) standard, for example.

In a case where no region information is acquired from the image processing control section 124, the encode section 126 conveys an encoded image data to the image data buffer 116. Hereinafter, the encoded image data, i.e., the data representing the entire encoded image may be referred to as "normal data" in some cases.

In addition, in a case where the region information is acquired from the image processing control section 124, the encode section 126 conveys the acquired region information and the encoded region data corresponding to the region to the image data buffer 116.

The image processing circuit 106 includes, for example, the region cut-out section 122, the image processing control section 124, and the encode section 126, to thereby perform processing related to the transmission method according to the present embodiment. It is to be noted that, in the functional blocks of the image processing circuit 106 illustrated in FIG. 12, the functions of the image processing circuit 106 are divided for the sake of convenience, and the way in which the functions are divided in the image processing circuit 106 is not limited to the example illustrated in FIG. 12.

The LINK control circuit 108 conveys the frame information, for example, to the ECC generation circuit 110, the PH generation circuit 112, and the synthesizing circuit 118 for each row.

The ECC generation circuit 110 sets an error correction code for each row. On the basis of data (e.g., VC number, data type, etc.) in one row in the frame information, for example, the ECC generation circuit 110 generates an error correction code for the row. The ECC generation circuit 110 is coupled to each of the PH generation circuit 112, the EBD buffer 114, the image data buffer 116, and the synthesizing circuit 118, for example. Then, the ECC generation circuit 110 conveys the generated error correction code to each of the PH generation circuit 112, the EBD buffer 114, the image data buffer 116, and the synthesizing circuit 118. In addition, the ECC generation circuit 110 may generate the error correction code in cooperation with the PH generation circuit 112 or the like.

The PH generation circuit 112 uses the frame information to generate a packet header for each row.

The PH generation circuit 112 may generate the packet header on the basis of the region information conveyed from the image processing circuit 106 (the image processing control section 124 in the example of FIG. 12). Specifically, on the basis of the region information, the PH generation circuit 112 sets, in the packet header, "data (change information) indicating whether or not the information included in the region information described above has been changed from the region information included in the packet to be transmitted one time before".

The EBD buffer 114 is a buffer that temporarily holds additional information conveyed from the image processing circuit 106 (the image processing control section 124 in FIG. 12). The EBD Buffer 114 outputs the additional information as the "Embedded Data" to the synthesizing circuit 118 at a predetermined timing. It is to be noted that the "Embedded Data" outputted from the EBD buffer 114 may be conveyed to the synthesizing circuit 118 via the image data buffer 116 described later.

The image data buffer 116 is a buffer that temporarily holds data (normal data, or region information and region data) conveyed from the image processing circuit 106 (the encode section 126 in FIG. 12). The image data buffer 116 outputs the held data to the synthesizing circuit 118 at a predetermined timing for each row.

The synthesizing circuit 18 generates a packet to be transferred on the basis of data acquired from each of the ECC generation circuit 110, the PH generation circuit 112, the EBD buffer 114, and the image data buffer 116, for example.

The transmission circuit 120 transmits the packet conveyed from the synthesizing circuit 118 via the data bus B1 (an example of a transfer path of a signal; hereinafter, the same) for each row. For example, the transmission circuit 120 transmits the packet using a high-speed differential signal as illustrated in FIG. 4.

For example, in a case where the region 1, the region 2, the region 3, and the region 4 illustrated in FIG. 5 are set, the transmission circuit 120 transmits the set region information and the region data corresponding to the region in a long packet for each row, as illustrated in FIG. 9.

In addition, in a case where no region is set, i.e., the normal data is outputted from the image data buffer 116, the transmission circuit 120 transmits a long packet in which data corresponding to each row is stored in the payload, for each row. It is to be note that, also in this case, the transmission circuit 120 is able to transmit the additional information as the "Embedded Data".

The image sensor 100 corresponding to the first transmission scheme has a hardware configuration illustrated in FIG. 12, for example. It is needless to say that the hardware configuration of the image sensor 100 corresponding to the first transmission scheme is not limited to the example illustrated in FIG. 12.

(1-3-2) Configuration of Processor 200 (Receiver) Corresponding to First Transmission Scheme FIG. 13 is a functional block diagram illustrating an example of the configuration of the processor 200 corresponding to the first transmission scheme according to the transmission method of the present embodiment. FIG. 13 illustrates only the image sensor 100 together for the sake of convenience. The processor 200 includes, for example, a header separation unit 202, a header interpretation unit 204, a payload separation unit 206, an image processing unit 208, an arithmetic operation unit 210, and a transmission unit 212.

The header separation unit 202 separates header data corresponding to a header part and payload data corresponding to a payload part from received data. The header separation unit 202 separates the header data from the received data in accordance with a rule predefined by a standard, or the like, for example. In addition, the header separation unit 202 may separate the payload data from the received data in accordance with the rule predefined by a standard, or the like, or may separate the payload data from the received data on the basis of a result of processing of the header interpretation unit 204, for example.

The header interpretation unit 204 interprets a content indicated by the header data.

As an example, in a case where the header data indicates "0x38", for example, the header interpretation unit 204 interprets the information included in the region information as having been changed from the region information included in the packet to be transmitted one time before. In addition, in this case, the header interpretation unit 204 may interpret the region information as being included in the payload data.

As another example, in a case where the header data indicates "0x39", for example, the header interpretation unit 204 interprets as the information included in the region information as not having been changed from the region information included in the packet to be transmitted one time before. In addition, in this case, the header interpretation unit 204 may interpret the region information as not being included in the payload data.

It is to be noted that the example of the processing in the header interpretation unit 204 is not limited to the examples described above. For example, the header interpretation unit 204 may specify the position of the payload data, and convey the specified position to the header separation unit 202. In addition, the header interpretation unit 204 may also interpret whether the payload data is the "Embedded Data".

The payload separation unit 206 separates the additional information, the region information, and the image data (normal data or region data; hereinafter, the same in the description for FIG. 13) from the payload data, on the basis of a result of the interpretation in the header interpretation unit 204.

For example, in a case where the payload data is interpreted as the "Embedded Data" in the header interpretation unit 204, the payload separation unit 206 sets the payload data as the additional information.

In addition, in a case where the payload data is not interpreted as the "Embedded Data" in the header interpretation unit 204, the payload separation unit 206 separates the region information and the image data from the payload data. For example, as described with reference to FIGS. 6, 8, and 9, the region information and the region data are stored in the payload, and the region information is stored in the head part of the payload. In addition, in a case where the normal data is transmitted from the image sensor 100, the region information is not stored in the payload. Accordingly, the payload separation unit 206 is able to separate the region data and the image data by processing the payload from the head part.

The image processing unit 208 processes the image data for each row on the basis of the additional information, the region information, and the image data conveyed from the payload separation unit 206, and obtains data representing an image corresponding to the region or data representing the entire image.

For example, the image processing unit 208 may determine whether the data acquired via the data bus B1 is data representing an image corresponding to the region or data representing the entire image, on the basis of the information conveyed from the payload separation unit 206, and perform processing in a processing mode depending on a result of the determination.

For example, in a case where the region information is conveyed when processing on an image of a certain frame is first performed (i.e., when processing corresponding to the first row is performed), the image processing unit 208 determines that data acquired via the data bus B1 is the data representing an image corresponding to the region. Then, the image processing unit 208 shifts to a processing mode for processing the region data to obtain data representing an image corresponding to the region on the basis of the region information and the region data for each row.

For example, in a case where the region information is not conveyed when the processing on the image of a certain frame is first performed, the image processing unit 208 determines that the data acquired via the data bus B1 is the data representing the entire image. The image processing unit 208 then shifts to a normal processing mode to obtain data representing the entire image on the basis of the normal data for each row.

It is to be noted that the method of determining the data acquired via the data bus B1 is not limited to the examples described above. For example, in a case where the information regarding the region (e.g., one or two or more of the information indicating the data amount of the region, the information indicating the size of the region, and the information indicating priority of the region) is conveyed as the additional information, the image processing unit 208 may determine that the data acquired via the data bus B1 is the data representing an image corresponding to the region.

The image processing unit 208 includes, for example, a decode section 214 and an image generation section 216.

The decode section 214 decodes an image data in a predetermined scheme corresponding to the encoding in the image sensor 100, for example. At this time, the decode section 214 may change the content of processing on the basis of the additional information.

The Image generation section 216 generates data representing an image corresponding to the region or data representing the entire image from the image data for each row decoded by the decode section 214 on the basis of the region information.

For example, in a case where the region information is conveyed when the processing on the image of a certain frame is first performed, the image generation section 216 determines that the image data conveyed from the decode section 214 is the region data. In addition, in a case where it is determined that the image data is the region data, the image generation section 216 divides the region data for each row on a row-by-row basis on the basis of the region information. Here, the region information to be used for processing by the image generation section 216 may include region information corresponding to rows to be processed and region information corresponding to already-processed rows.

Here, the region information basically includes the information indicating the position of the row, the identification information on the region included in the row, the information indicating the position of the column of the region included in the row, and the information indicating the size of the region included in the row, thus enabling the image generation section 216 to uniquely specify the region data included in each row. Accordingly, the image generation section 216 is able to generate, for each region, data representing an image corresponding to the region set in the image of a certain frame.

In addition, in a case where the region information is not conveyed when the processing on the image of a certain frame is first performed, the image generation section 216 determines that the image data to be conveyed is normal data. In a case where it is determined that the image data is normal data, the image generation section 216 generates the data representing the entire image from the image data for each row conveyed from the decode section 214.

The image processing unit 208 includes, for example, the decode section 214 and the image generation section 216 to thereby obtain data representing an image corresponding to the region or data representing the entire image.

The arithmetic operation unit 210 performs processing based on the image data obtained in the image processing unit 208, for example. Examples of the image data obtained in the image processing unit 208 include image data representing the entire image, image data representing an image corresponding to the region, and image data representing an image in which the entire image is reduced.

Examples of the processing based on the image data obtained in the image processing unit 208 include processing related to recording control of the image data into a recording medium such as the memory 300 and processing related to display control of the image on a display screen of the display device 400.

It is to be noted that the processing in the arithmetic operation unit 210 is not limited to the examples described above. For example, as described above, the arithmetic operation unit 210 is able to perform various types of processing, such as processing related to the setting of the region for the image.

As an example of the processing related to the setting of the region for the image in the arithmetic operation unit 210, the arithmetic operation unit 210 sets the region by performing various arithmetic operations on the image data obtained in the image processing unit 208, such as an arithmetic operation related to feature point extraction, an arithmetic operation related to motion extraction, and an arithmetic operation via machine learning. In addition, the arithmetic operation unit 210 generates the region-designating information corresponding to the set region. It is needless to say that the example of the processing related to the setting of the region for the image in the arithmetic operation unit 210 is not limited to the examples described above.

The transmission unit 212 transmits various types of data (e.g., image data, control information, etc.) to an external device via the control bus B2, various signal lines, or the like. Examples of the transmission unit 212 include a communication device conforming to a predetermined standard such as I2C (Inter Integrated Circuits) and I3C (Improved Inter Integrated Circuits) included in the processor 200.

Communication in the transmission unit 212 is controlled by, for example, the arithmetic operation unit 210. The arithmetic operation unit 210 causes the transmission unit 212 to transmit the image data to thereby achieve, for example, the recording of the image data into the recording medium such as the memory 300 and the display of the image on the display screen of the display device 400. In addition, the arithmetic operation unit 210 causes the transmission unit 212 to transmit control information including the region-designating information to the image sensor 100 via the control bus B1 to thereby achieve the transmission of the region-designating information indicating the set region to the image sensor 100.

The processor 200 includes, for example, the header separation unit 202, the header interpretation unit 204, the payload separation unit 206, the image processing unit 208, the arithmetic operation unit 210, and the transmission unit 212 to thereby obtain data representing an image corresponding to the region or data representing the entire image on the basis of the data received from the image sensor 100. It is to be noted that, in the functional blocks of the processor 200 illustrated in FIG. 13, the functions of the processor 200 are divided for the sake of convenience, and the way in which the functions are divided in the processor 200 is not limited to the example illustrated in FIG. 13. In addition, the processor 200 may not necessarily include the transmission unit 212 in a case where a function of transmitting various types of data to an external device is not provided.

(2) Second Transmission Scheme (2-1) Processing According to Second Transmission Scheme The image sensor 100 stores the region data in payload of a first packet, and stores each information included in the region information in each second packet different from the first packet. The image sensor 100 then causes the first packet and the second packet to be transmitted for each row.

Examples of the first packet according to the second transmission scheme include a long packet of the MIPI, and examples of the second packet according to the second transmission scheme include a short packet of the MIPI. It is to be noted that examples of the first packet and the second packet according to the present embodiment are not limited to the examples described above. Other examples of the first packet and the second packet according to the present embodiment are described later in a third transmission scheme. The second transmission scheme described below exemplifies a case where the first packet is a long packet of the MIPI and the second packet is a short packet of the MIPI.

FIG. 14 is an explanatory diagram illustrating an example of data to be transmitted by the second transmission scheme according to the transmission method of the present embodiment. FIG. 14 illustrates "examples in which each information included in the region information corresponding to each of the region 1, the region 2, the region 3, and the region 4 illustrated in FIG. 5 is transmitted for each row by a short packet of the MIPI illustrated in FIG. 2". In addition, FIG. 14 illustrates "examples in which the region data corresponding to each of the region 1, the region 2, the region 3, and the region 4 illustrated in FIG. 5 is stored in payload of a long packet of the MIPI illustrated in FIG. 3, and are transmitted for each row".

"Y" illustrated in FIG. 14 indicates a short packet in which the information indicating the position of the row is stored. "I1", "I2", "I3", and "I4" illustrated in FIG. 14 indicate short packets that store pieces of region identification information corresponding, respectively, to the region 1, the region 2, the region 3, and the region 4 illustrated in FIG. 5. "X1", "X2", "X3", and "X4" illustrated in FIG. 14 indicate short packets that store pieces of information indicating column positions in regions corresponding, respectively, to the region 1, the region 2, the region 3, and the region 4 illustrated in FIG. 5. "L1", "L2", "L3", and "L4" illustrated in FIG. 14 indicate short packets that store pieces of information indicating the sizes of the regions corresponding, respectively, to the region 1, the region 2, the region 3, and the region 4 illustrated in FIG. 5.

As illustrated in FIG. 6, in a case where the first transmission scheme described in (1) above is used, the region information and the region data are stored in payload of a single packet such as a long packet of the MIPI, for example, and are transmitted for each row.

Meanwhile in a case where the second transmission scheme is used as illustrated in FIG. 14, the region information and the region data are separately stored in different packets, and are transmitted for each row.

In addition, as illustrated in FIG. 14, also in a case where the second transmission scheme is used, it is possible to transmit the "Embedded Data" similarly to a case where the first transmission scheme is used. That is, the image sensor 100 is able to transmit, as the "Embedded Data" illustrated in FIG. 14, one or two or more of the information (examples of the additional information) indicating the data amount of the region, the information indicating the size of the region, and the information indicating priority of the region.

In addition, in a case where the second transmission scheme is used, the image sensor 100 may determine whether to transmit the data of the overlapping part overlappingly to transmit the data of the overlapping part overlappingly depending on a result of the determination, similarly to the case where the first transmission scheme is used.

(2-2) Feature and Advantage of Second Transmission Scheme

The second transmission scheme according to the transmission method of the present embodiment has, for example, the following features. It is needless to say that the features of the second transmission scheme according to the transmission method of the present embodiment are not limited to the examples described below.

Transmit additional information using EBD, and transmit region information corresponding to a set region using a short packet.

Transmit only information corresponding to a change point among information included in region information Able to cope with a region of an arbitrary shape In addition, in the second transmission scheme, the region information transmitted by a short packet has the following features, for example. It is needless to say that the features of the region information according to the second transmission scheme are not limited to the examples described below.

Transfer information on a plurality of identical regions present in one row by transmitting identification information on the identical regions for the number of the plurality of identical regions present in a case where the plurality of identical regions is present in one row Information indicating a position of a row (Y)
        Incremented by an initial value 0 (zero)
        Transmitted when not transmitted in accordance with a predetermined order (e.g., when thinned out)
    Identification information on a region (I)
        Transmitted when a region is increased or decreased
        Transmit in a case where a position of a column of a region or ROI length are changed
    Information (X) indicating a position of a column of a region
        Initial value 0 (zero)
        Transmitted when changed
        Transmitted as a set with identification information on a region
    Information indicating size of a region (L)
        Surely set in a row that is first to be transmitted
        Transmitted when changed
        Transmitted as a set with identification information on a region
        May be omitted in a case where only a single region is present in a row even when there is a change (because payload length of a long packet is identical to ROI length)

In addition, the second transmission scheme has, for example, the following advantages.

Able to correct error in region information
    Backward compatibility with already-defined CSI-2 standard
    Able to transfer shape of any region (ROI)

(2-3) Configuration Example According to Second Transmission Scheme

Next, description is given of an example of the configuration of the image sensor 100 corresponding to the second transmission scheme described above and an example of the configuration of the processor 200 corresponding to the second transmission scheme (example of the configuration related to the processing of data transmitted from the image sensor 100).

(2-3-1) Configuration of Image Sensor 100 (Transmitter) Corresponding to Second Transmission Scheme FIG. 15 is a hardware block diagram illustrating an example of the configuration of the image sensor 100 corresponding to the second transmission scheme according to the transmission method of the present embodiment. The image sensor 100 includes, for example, the image sensor device 102 and an IC chip 150. The image sensor 100 illustrated in FIG. 15 operates by electric power, etc. supplied from the internal power supply (not illustrated) configuring the communication system 1000, similarly to the image sensor 100 illustrated in FIG. 12.

The image sensor device 102 illustrated in FIG. 15 has functions and configurations similar to those of the image sensor device 102 illustrated in FIG. 12.

The IC chip 150 is a chip-shaped IC on which a circuit involving a data transmission function according to the second transmission scheme is integrated, and processes image data conveyed from the image sensor device 102 and transmits data corresponding to the generated image. It is to be noted that the circuit involving the function of transmitting data by the second transmission scheme is not limited to achievement in the form of a single IC chip, but may be formed by a plurality of the IC chips.

The IC chip 150 includes, for example, an image processing circuit 152, the LINK control circuit 108, the ECC generation circuit 110, a PH generation circuit 154, the EBD buffer 114, the image data buffer 116, a synthesizing circuit 156, and the transmission circuit 120.

The LINK control circuit 108, the ECC generation circuit 110, the EBD buffer 114, the image data buffer 116, and the transmission circuit 120 illustrated in FIG. 15 has functions and configurations similar to those of, respectively, the LINK control circuit 108, the ECC generation circuit 110, the EBD buffer 114, the image data buffer 116, and the transmission circuit 120 illustrated in FIG. 12.

The image processing circuit 152 is a single circuit having a function of performing processing related to the transmission method according to the present embodiment. In a case where the processing according to the transmission method of the present embodiment is performed, the image processing circuit 152 sets the region information for each row in the image, and causes the LINK control circuit 108, the ECC generation circuit 110, the PH generation circuit 154, the EBD buffer 114, the image data buffer 116, the synthesizing circuit 156, and the transmission circuit 120 to transmit the set region information and the region data corresponding to the region for each row by the second transmission scheme. In addition, the image processing circuit 152 is also able to cause the image data to be conveyed from the image sensor device 102 (i.e., data representing the entire image) to be transmitted for each row.

Examples of the image processing circuit 152 include a processor such as the MPU.

Description is given of functions of the image processing circuit 152 by dividing them into functional blocks. As illustrated in FIG. 15, the image processing circuit 152 includes, for example, the region cut-out section 122, the image processing control section 124, and an encode section 158.

The functions of the region cut-out section 122 and the image processing control section 124 illustrated in FIG. 15 are the same as those of the region cut-out section 122 and the image processing control section 124 illustrated in FIG. 12.

Similarly to the encode section 126 illustrated in FIG. 12, the encode section 158 encodes the image data conveyed from the image sensor device 102 in a predetermined scheme.

In a case where the region information is not acquired from the image processing control section 124, the encode section 158 conveys the encoded image data to the image data buffer 116 similarly to the encode section 126 illustrated in FIG. 12.

In addition, in a case where the region information is acquired from the image processing control section 124, the encode section 158 specifies a region on the basis of the acquired region information, and conveys the encoded region data corresponding to the specified region to the image data buffer 116.

The image processing circuit 152 includes, for example, the region cut-out section 122, the image processing control section 124, and the encode section 158 to thereby perform processing related to the transmission method according to the present embodiment. It is to be noted that, in the functional blocks of the image processing circuit 152 illustrated in FIG. 15, the functions of the image processing circuit 152 are divided for the sake of convenience, and the way in which the functions are divided in the image processing circuit 152 is not limited to the example illustrated in FIG. 15.

On the basis of the region information conveyed from the image processing circuit 152 (the image processing control section 124 in the example of FIG. 15), the PH generation circuit 154 generates short packets that each store information included in the region information.

In addition, similarly to the PH generation circuit 112 illustrated in FIG. 12, the PH generation circuit 154 generates a packet header of a long packet for each row using the frame information.

The synthesizing circuit 156 generates, as packets to be conveyed, a "short packet that stores the region information" and a "long packet that stores image data (normal data or region data) for each row in payload" on the basis of data acquired from each of the ECC generation circuit 110, the PH generation circuit 154, the EBD buffer 114, and the image data buffer 116.

The transmission circuit 120 transmits the packet conveyed from the synthesizing circuit 156 via the data bus B1 for each row.

For example, in a case where the region 1, the region 2, the region 3, and the region 4 illustrated in FIG. 5 are set, the transmission circuit 120 stores each information included in the region information in the short packet, and stores the region data in the payload of the long packet for transmission for each row, as illustrated in FIG. 14.

In addition, in a case where no region is set. i.e., in a case where normal data is outputted from the image data buffer 116, the transmission circuit 120 transmits, for each row, a long packet in which data corresponding to each row is stored in the payload, similarly to the transmission circuit 120 illustrated in FIG. 12. It is to be noted that, also in this case, the transmission circuit 120 is able to transmit the additional information as the "Embedded Data" similarly to the transmission circuit 120 illustrated in FIG. 12.

The image sensor 100 corresponding to the second transmission scheme has, for example, the hardware configuration illustrated in FIG. 15. It is needless to say that the hardware configuration of the image sensor 100 corresponding to the second transmission scheme is not limited to the example illustrated in FIG. 15.

(2-3-2) Configuration of Processor 200 (Receiver) Corresponding to Second Transmission Scheme FIG. 16 is a functional block diagram illustrating an example of the configuration of the processor 200 corresponding to the second transmission scheme according to the transmission method of the present embodiment. FIG. 16 illustrates only the image sensor 100 together for the sake of convenience. The processor 200 includes, for example, a packet separation unit 250, a short packet interpretation unit 252, a long packet separation unit 254, a header interpretation unit 256, a payload interpretation unit 258, the image processing unit 208, the arithmetic operation unit 210, and the transmission unit 212.

The packet separation unit 250 separates a short packet and a long packet from the received data. The packet separation unit 250 detects a delimitation of the short packet, for example, to thereby separate the short packet and the long packet.

The short packet interpretation unit 252 extracts various types of information configuring the region information from the short packet conveyed from the packet separation unit 250, and conveys the region information to the image processing unit 208.

Similarly to the header separation unit 202 illustrated in FIG. 13, the long packet separation unit 254 separates header data corresponding to a header part and payload data corresponding to a payload part from the long packet conveyed from the packet separation unit 250.

The header interpretation unit 256 interprets a content indicated by the header data. For example, the header interpretation unit 256 interprets whether the payload data is the "Embedded Data". In addition, the header interpretation unit 256 may specify a position of the payload data, and convey the specified position to the long packet separation unit 254.

On the basis of a result of the interpretation in the header interpretation unit 256, the payload interpretation unit 258 extracts additional information or image data (normal data or region data; hereinafter, the same in the description for FIG. 16) from the payload data.

For example, in a case where the payload data is interpreted as the "Embedded Data" in the header interpretation unit 256, the payload interpretation unit 258 sets the payload data as the additional information.

In addition, in a case where the payload data is not interpreted as the "Embedded Data" in the header interpretation unit 256, the payload interpretation unit 258 sets the payload data as image data.

Similarly to the image processing unit 208 illustrated in FIG. 13, the image processing unit 208 illustrated in FIG. 16 processes image data for each row on the basis of the additional information, the region information, and the image data, and obtains data representing an image corresponding to the region or data representing the entire image.

Similarly to the arithmetic operation unit 210 illustrated in FIG. 13, the arithmetic operation unit 210 illustrated in FIG. 16 performs various types of processing such as processing based on image data obtained in the image processing unit 208 and processing related to the setting of a region for the image.

Similarly to the transmission unit 212 illustrated in FIG. 13, the transmission unit 212 illustrated in FIG. 16 transmits various types of data (e.g., image data, control information, etc.) to an external device via the control bus B2, various signal lines, and the like.

The processor 200 includes, for example, the packet separation unit 250, the short packet interpretation unit 252, the long packet separation unit 254, the header interpretation unit 256, the payload interpretation unit 258, the image processing unit 208, the arithmetic operation unit 210, and the transmission unit 212, to thereby enable the data representing an image corresponding to the region or the data representing the entire image to be obtained on the basis of the data received from the image sensor 100. It is to be noted that, in the functional blocks of the processor 200 illustrated in FIG. 16, the functions of the processor 200 are divided for the sake of convenience, and the way in which the functions are divided in the processor 200 is not limited to the example illustrated in FIG. 16. In addition, similarly to the processor 200 illustrated in FIG. 13, the processor 200 may not necessarily include the transmission unit 212 in a case where the function of transmitting various types of data to an external device is not provided.

(3) Third Transmission Scheme (3-1) Processing According to Third Transmission Scheme Similarly to the second transmission scheme described in (2) above, the image sensor 100 stores the region data in payload of a first packet, and stores information included in the region information in a second packet different from the first packet. The image sensor 100 then causes the first packet and the second packet to be transmitted for each row.

Examples of the first packet according to the third transmission scheme include a long packet of the MIPI, and examples of the second packet according to the third transmission scheme include a packet header. That is, in the second transmission scheme, for example, the region information is transmitted by the short packet of the MIPI, whereas in the third transmission scheme, the region information is transmitted by the packet header.

Here, as illustrated in FIGS. 2 and 3, the short packet and the packet header have a similar structure. Accordingly, the image sensor 100 using the third transmission scheme is able to transmit the region information and the region data for each row, similarly to the image sensor 100 using the second transmission scheme described in (2) above.

In addition, similarly to the image sensor 100 using the first transmission scheme described in (1) above, the image sensor 100 using the third transmission scheme may determine whether to cause data of an overlapping part to be transmitted overlappingly to cause the data of the overlapping part to be transmitted overlappingly depending on a result of the determination.

It is to be noted that the second packet according to the third transmission scheme is not limited to the packet header having a structure similar to that of the packet header illustrated in FIG. 3. For example, the second packet according to the third transmission scheme may be a packet header having a configuration in which "Data Field" illustrated in FIG. 2 is extended (e.g., a packet header in which "Data Field" is extended from 2 [byte] to 3 [byte] or more). In a case where the second packet according to the third transmission scheme is a packet header having the extended structure, information included in the region information may be stored in one second packet.

In addition, in the third transmission scheme, a region in which information included in the region information is stored may be a portion of the first packet. That is, it is also possible, in the third transmission scheme, to construe the first packet and the second packet as one packet.

(3-2) Feature and Advantage of Third Transmission Scheme

The third transmission scheme according to the transmission method of the present embodiment has features similar to those of the second transmission scheme described in (2) above.

In addition, the third transmission scheme has, for example, the following advantages.

High transfer efficiency

Able to correct error in region information

Able to transfer shape of any region (ROI)

(3-3) Configuration Example According to Third Transmission Scheme

The image sensor 100 corresponding to the third transmission scheme has, for example, a configuration (including a modification example) similar to that of the image sensor 100 corresponding to the second transmission scheme described in (2) above and illustrated in FIG. 14. In addition, the processor 200 corresponding to the third transmission scheme has, for example, a configuration (including a modification example) similar to that of the processor 200 corresponding to the second transmission scheme described in (2) above and illustrated in FIG. 15.

[4] Example of Effects Achieved by Using Transmission Method According to the Present Embodiment Using the transmission method according to the present embodiment makes it possible to achieve the following effects, for example. It is needless to say that the effects achieved by using the transmission method according to the present embodiment are not limited to the examples described below.

It is not necessary to divide VC for each region in transmitting data of region (ROI) set for an image.

It is possible to collectively transmit data of each region included in an identical row in transmitting data of region (ROI) set for an image.

It is possible to transmit only information corresponding to a change point among information included in region information, thus making it possible to further reduce a data amount of the region information (i.e., making it possible to transfer minimum region information).

It is possible to cope with a region of an arbitrary shape, such as a rectangular, elliptical, or toroidal shape.

It is possible to transfer region data even in a case where set regions overlap each other as in the region 3 and the region 4 in FIG. 5.

No LPS period due to transmission of region information is increased because the region information is stored in payload of a packet for transmission in a case where the first transmission scheme is used. Accordingly, it is unlikely that the region information may influence the transfer efficiency in a case where the first transmission scheme is used.

(Program According to the Present Embodiment)

A program for causing a computer to function as a transmitter according to the present embodiment (e.g., a program for causing a computer to execute processing related to the transmission method according to the present embodiment) is executed by a processor or the like in the computer, thereby making it possible to transmit data of a region of an arbitrary shape set for an image.

In addition, a program for causing a computer to function as a transmitter according to the present embodiment is executed by a processor or the like in the computer, thereby making it possible to achieve effects obtained by using the above-described transmission method according to the present embodiment.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, the description is given above of a program (a computer program) for causing a computer to function as the transmitter according to the present embodiment; however, it is also possible to additionally provide a recording medium in which the above-described program is stored, in accordance with the present embodiment.

The above-described configuration represents an example of the present embodiment, and naturally comes under the technical scope of the present disclosure.

In addition, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the technical scope of the present disclosure also includes the following configurations.

(1)

A transmitter including an image processor that sets region information corresponding to a region set for an image for each row in the image, and transmits the set region information and region data corresponding to the region for each row, the image processor setting the region by analyzing the image or on a basis of externally acquired region-designating information, and the region information including information indicating a position of a row and information indicating a position of a column of the region included in the row.

(2)
The transmitter according to (1), in which the region-designating information is acquired from a receiver to which the region data is transmitted.

(3)
The transmitter according to (1) or (2), in which
the image processor, in a case where there is an overlapping part at which a plurality of the regions overlap, determines whether to cause data of the overlapping part to be transmitted overlappingly by the region data corresponding to each of the plurality of the regions, and
the image processor, in a case of determining that the overlapping transmission is performed, causes the data of the overlapping part to be transmitted overlappingly.

(4)
The transmitter according to (3), in which the image processor determines whether to perform the overlapping transmission on a basis of number of columns in a row including the overlapping part.

(5)
The transmitter according to (3), in which the image processor determines whether to perform the overlapping transmission on a basis of a set operation mode.

(6)
The transmitter according to any one of (1) to (5), in which the region information further includes identification information on the region included in a row and information indicating a size of the region included in the row.

(7)
The transmitter according to any one of (1) to (6), in which the image processor collectively sets, as the region information, information included in the region information for each of a plurality of the regions.

(8)
The transmitter according to (7), in which, in a case where the plurality of the regions are present that are identical in one row, the image processor sets the region information for number of the regions that are present.

(9)
The transmitter according to any one of (1) to (8), in which the image processor does not set, as the region information, information that has not been changed from information included in the region information in a row to be transmitted one time before.

(10)
The transmitter according to (9), in which
the image processor, when setting the information indicating the position of the column of the region as the region information, sets an identification information on the region as the region information, and
the image processor, when setting the information indicating the size of the region as the region information, sets the identification information on the region as the region information.

(11)
The transmitter according to (9) or (10), in which
the image processor causes the region information and the region data to be transmitted for each row in accordance with a predetermined order, and
the image processor, in a case where the row for transmission of the region information and the region data is a row according to the predetermined order, does not set the information indicating the position of the row as the region information.

(12)
The transmitter according to any one of (1) to (11), in which the image processor stores the region information and the region data in payload of a packet and causes the region information and the region data to be transmitted.

(13)
The transmitter according to (12), in which the region data is stored in a head part of the payload.

(14)
The transmitter according to (12) or (13), in which the image processor further causes change information to be transmitted for each row, the change information indicating whether or not information included in the region information has been changed from the region information included in the packet to be transmitted one time before.

(15)
The transmitter according to (14), in which, in a case where the information included in the region information has not been changed from the region information included in the packet to be transmitted one time before, the image processor does not cause the region information to be transmitted.

(16)
The transmitter according to any one of (12) to (15), in which the image processor further causes one or two or more of information indicating a data amount of the region, the information indicating the size of the region, and information indicating priority of the region to be transmitted.

(17)
The transmitter according to any one of (12) to (16), in which the packet includes a long packet of MIPI.

(18)
The transmitter according to any one of (1) to (11), in which
the image processor stores the region data in payload of a first packet,
the image processor stores each information included in the region information in each second packet different from the first packet, and
the image processor causes the first packet and the second packet to be transmitted for each row.

(19)
The transmitter according to (18), in which
the first packet includes a long packet of MIPI, and
the second packet includes a short packet of the MIPI.

REFERENCE NUMERALS LIST

100 Image sensor
102 Image sensor device
104, 150 IC chip
106, 152 Image processing circuit
108 LINK control circuit
110 ECC generation circuit
112, 154 PH generation circuit
114 EBD buffer
116 Image data buffer
118, 156 Synthesizing circuit
120 Transmission circuit
122 Region cut-out section
124 Image processing control section
126, 158 Encode section
200 Processor
202 Header separation unit
204 Header interpretation unit
206 Payload separation unit
208 Image processing unit 210 Arithmetic operation unit
212 Transmission unit
214 Decode section
216 Image generation section
250 Packet separation unit
252 Short packet interpretation unit
254 Long packet separation unit
256 Header interpretation unit
258 Payload interpretation unit
300 Memory
400 Display device
1000 Communication system
B1 Data bus
B2 Control bus

The invention claimed is:

1. A transmitter comprising:
an image processor configured to set region information corresponding to a region set for an image for each row in the image, and to transmit the set region information and region data corresponding to the region for each row, wherein
the image processor sets the region by analyzing the image or on a basis of externally acquired region-designating information,
the region information including information indicating a position of a row and information indicating a position of a column of the region included in the row,
the image processor, in a case where there is an overlapping part at which a plurality of the regions overlap, determines whether to cause data of the overlapping part to be transmitted overlappingly by the region data corresponding to each of the plurality of the regions, and
the image processor, in a case of determining that the overlapping transmission is performed, causes the data of the overlapping part to be transmitted overlappingly.

2. The transmitter according to claim 1, wherein the region-designating information is acquired from a receiver to which the region data is transmitted.

3. The transmitter according to claim 1, wherein
the image processor determines whether to perform the overlapping transmission on a basis of number of columns in a row including the overlapping part.

4. The transmitter according to claim 1, wherein
the image processor determines whether to perform the overlapping transmission on a basis of a set operation mode.

5. The transmitter according to claim 1, wherein
the region information further includes identification information on the region included in a row and information indicating a size of the region included in the row.

6. The transmitter according to claim 1, wherein
the image processor collectively sets, as the region information, information included in the region information for each of a plurality of the regions.

7. The transmitter according to claim 6, wherein,
in a case where the plurality of the regions are present that are identical in one row, the image processor sets the region information for number of the regions that are present.

8. A transmitter comprising:
an image processor configured to set region information corresponding to a region set for an image for each row in the image, and to transmit the set region information and region data corresponding to the region for each row, wherein
the image processor sets the region by analyzing the image or on a basis of externally acquired region-designating information,
the region information including information indicating a position of a row and information indicating a position of a column of the region included in the row, and
the image processor does not set, as the region information, information that has not been changed from information included in the region information in a row to be transmitted one time before.

9. The transmitter according to claim 8, wherein
the image processor, when setting the information indicating the position of the column of the region as the region information, sets an identification information on the region as the region information, and
the image processor, when setting information indicating a size of the region as the region information, sets the identification information on the region as the region information.

10. The transmitter according to claim 8, wherein
the image processor causes the region information and the region data to be transmitted for each row in accordance with a predetermined order, and
the image processor, in a case where the row for transmission of the region information and the region data is a row according to the predetermined order, does not set the information indicating the position of the row as the region information.

11. A transmitter comprising:
an image processor configured to set region information corresponding to a region set for an image for each row in the image, and to transmit the set region information and region data corresponding to the region for each row, wherein
the image processor sets the region by analyzing the image or on a basis of externally acquired region-designating information,
the region information including information indicating a position of a row and information indicating a position of a column of the region included in the row,
the image processor stores the region information and the region data in payload of a packet and causes the region information and the region data to be transmitted, and
the image processor further causes change information to be transmitted for each row, the change information indicating whether or not information included in the region information has been changed from the region information included in the packet to be transmitted one time before.

12. The transmitter according to claim 11, wherein
the region data is stored in a head part of the payload.

13. The transmitter according to claim 11, wherein,
in a case where the information included in the region information has not been changed from the region information included in the packet to be transmitted one time before, the image processor does not cause the region information to be transmitted.

14. The transmitter according to claim 11, wherein
the image processor further causes one or two or more of information indicating a data amount of the region, information indicating a size of the region, and information indicating priority of the region to be transmitted.

15. The transmitter according to claim 11, wherein
the packet comprises a long packet of Mobile Industry Processor Interface Alliance.

16. A transmitter comprising:
an image processor configured to set region information corresponding to a region set for an image for each row in the image, and to transmit the set region information and region data corresponding to the region for each row, wherein
the image processor sets the region by analyzing the image or on a basis of externally acquired region-designating information,
the region information including information indicating a position of a row and information indicating a position of a column of the region included in the row,
the image processor stores the region data in payload of a first packet,
the image processor stores each information included in the region information in each second packet different from the first packet, and
the image processor causes the first packet and the second packet to be transmitted for each row.

17. The transmitter according to claim 16, wherein
the first packet comprises a long packet of Mobile Industry Processor Interface Alliance, and
the second packet comprises a short packet of the Mobile Industry Processor Interface Alliance.

* * * * *